US011716044B2

(12) United States Patent
Watanabe

(10) Patent No.: US 11,716,044 B2
(45) Date of Patent: Aug. 1, 2023

(54) POWER CONVERSION DEVICE AND ELECTRIC MOTOR DRIVE SYSTEM

(71) Applicant: TOSHIBA MITSUBISHI-ELECTRIC INDUSTRIAL SYSTEMS CORPORATION, Chuo-ku (JP)

(72) Inventor: Fumio Watanabe, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/637,679

(22) PCT Filed: Sep. 2, 2019

(86) PCT No.: PCT/JP2019/034339
§ 371 (c)(1),
(2) Date: Feb. 23, 2022

(87) PCT Pub. No.: WO2021/044457
PCT Pub. Date: Mar. 11, 2021

(65) Prior Publication Data
US 2022/0286076 A1    Sep. 8, 2022

(51) Int. Cl.
*H02P 27/08* (2006.01)
*H02P 23/22* (2016.01)

(52) U.S. Cl.
CPC ........... *H02P 27/085* (2013.01); *H02P 23/22* (2016.02); *H02P 2205/03* (2013.01)

(58) Field of Classification Search
CPC ..... H02P 27/085; H02P 23/22; H02P 2205/03
See application file for complete search history.

(56) References Cited

U.S. PATENT DOCUMENTS 4,227,138 A * 10/1980 Espelage ............... H02P 27/045
                                                318/807
7,659,684 B2 * 2/2010 Patel ........................ H02P 27/08
                                                318/632

(Continued)

FOREIGN PATENT DOCUMENTS

JP       2009-303288 A    12/2009
JP        2019-68666 A     4/2019
WO    WO 2018/042895 A     8/2018

OTHER PUBLICATIONS

Indian Office Action dated May 26, 2022 in Indian Patent Application No. 202217005953, 5 pages.

(Continued)

*Primary Examiner* — Rina I Duda
(74) *Attorney, Agent, or Firm* — Oblon, McClelland, Maier & Neustadt, L.L.P.

(57) ABSTRACT

A power conversion device includes an inverter, a current detector, a frequency analysis processor, a storage, a determination unit, a reference rotational rate change unit, and a rate controller. The determination unit determines a frequency at which a signal component having a magnitude exceeding a prescribed value has been detected among frequency components of a load current, generates restriction information for excluding a reference rotational rate for a rotational rate corresponding to the detected frequency based on a determination result after the determination, and causes the storage to store the generated restriction information. The reference rotational rate change unit changes a reference rotational rate of an electric motor so that mechanical resonance of the detected frequency is avoided based on the stored restriction information. The rate controller controls a rotational rate of the inverter using the changed reference rotational rate. The electric motor is driven at the controlled rotational rate.

8 Claims, 13 Drawing Sheets

(56) References Cited

U.S. PATENT DOCUMENTS

| | | | |
|---|---|---|---|
| 9,698,722 B2* | 7/2017 | Loken | H02P 29/68 |
| 2013/0002187 A1* | 1/2013 | Spreen | H02P 23/0077 |
| | | | 318/811 |
| 2015/0015171 A1* | 1/2015 | Nishibata | H02P 21/14 |
| | | | 318/400.15 |
| 2019/0052203 A1* | 2/2019 | Yajima | B60L 3/0061 |
| 2019/0222160 A1 | 7/2019 | Yoshida et al. | |

OTHER PUBLICATIONS

International Search Report dated Dec. 3, 2019 in PCT/JP2019/034339 filed on Sep. 2, 2019 (1 page).

* cited by examiner

| REFERENCE ROTATIONAL RATE | HARMONIC DETECTION VALUE | | | FREQUENCY JUMP REQUEST FLAG | | | |
|---|---|---|---|---|---|---|---|
| $\omega$ % | 3f DETECTION VALUE | 5f DETECTION VALUE | 7f DETECTION VALUE | 3fjr | 5fjr | 7fjr | |
| 1% | 0.1 | 0.2 | 0.1 | No | No | No | |
| 2% | 0.3 | 0.4 | 0.5 | No | No | No | |
| ... | ... | ... | ... | ... | ... | ... | |
| 23% | 2.9 | 1.5 | 2.4 | No | No | No | |
| 24% | 3.1 | 1.6 | 2.3 | Yes | No | No | ←$\omega LL$ |
| 25% | 3.2 | 1.5 | 2.2 | Yes | No | No | |
| 26% | 3.1 | 1.7 | 2.1 | Yes | No | No | ←$\omega UL$ |
| 27% | 2.8 | 1.8 | 2.5 | No | No | No | |
| ... | ... | ... | ... | ... | ... | ... | |
| ... | ... | ... | ... | ... | ... | ... | |
| 100% | ... | ... | ... | ... | ... | ... | |

621t

POWER CONVERSION DEVICE AND ELECTRIC MOTOR DRIVE SYSTEM

TECHNICAL FIELD

Embodiments of the present invention relate to a power conversion device and an electric motor drive system.

BACKGROUND ART

A power conversion device and an electric motor drive system set a reference rotational rate (a reference angular velocity), as a target value and cause an electric motor and a mechanical load connected to a shaft of the electric motor to be driven by controlling the number of revolutions per unit time of the shaft (a rotor) of the electric motor. When the rotational rate of the electric motor reaches a specific rotational rate, the electric motor may mechanically resonate.

CITATION LIST

Patent Literature

[Patent Literature 1]
Japanese Unexamined Patent Application, First Publication No. 2009-303288

SUMMARY OF INVENTION

Technical Problem

An objective of the present invention is to provide a power conversion device and an electric motor drive system for driving an electric motor so that vibrations due to mechanical resonance do not occur.

Solution to Problem

According to an embodiment, a power conversion device includes an inverter, a current detector, a frequency analysis processing unit, a storage unit, a determination unit, a reference rotational rate change unit, and a rate control unit. The inverter converts direct current (DC) power into alternating current (AC) power by causing a switching device to perform a switching operation and supplies the AC power to an electric motor. The current detector detects a load current that flows from the inverter to a winding of the electric motor. The frequency analysis processing unit calculates a frequency component defined on the basis of fundamental waves of an AC of the detected load current. The storage unit stores restriction information for excluding a reference rotational rate for a specific rotational rate from among reference rotational rates for designating rotational rates of the electric motor. The determination unit determines a frequency at which a signal component having a magnitude exceeding a prescribed value has been detected among frequency components of the load current, generates restriction information for excluding a reference rotational rate for a rotational rate corresponding to the frequency at which the signal component has been detected on the basis of a determination result after the determination, and causes the storage unit to store the generated restriction information. The reference rotational rate change unit changes a reference rotational rate of the electric motor so that mechanical resonance of the frequency at which the signal component has been detected is avoided on the basis of the stored restriction information. The rate control unit controls the inverter and causes the electric motor to be driven at the rotational rate based on the changed reference rotational rate.

DESCRIPTION OF EMBODIMENTS

Hereinafter, a power conversion device and an electric motor drive system of embodiments will be described with reference to the drawings. In the following description, components having the same or similar functions are denoted by the same reference signs.

The term "connection" mentioned in the specification is not limited to the case of a physical connection and also includes the case of an electrical connection. The term "rotational rate" mentioned in the specification is a physical quantity corresponding to a rotor angular velocity of an electric motor. The term "reference rotational rate" mentioned in the specification is a control target value of a rotational rate of the electric motor and can be represented by an angular velocity of the rotor, a rotational rate of the rotor, a frequency corresponding to the rotational rate of the rotor, or the like. In the following description, an example in which the rotational rate of the electric motor is controlled using the reference rotational rate defined by the rotational rate of the rotor will be described. For example, the term "revolutions per minute (rpm)" or the like is used as a unit based on the reference rotational rate. In the following description, a frequency of fundamental waves of an alternating current (AC) output by a power conversion device is referred to as a fundamental frequency f. In this case, the fundamental frequency f becomes a frequency corresponding to the reference rotational rate according to rate control. A relationship between the rotational rate and the fundamental frequency f is as shown in the following Eq. (1).

$$f(Hz) = |\text{rotational rate (rpm)}|/60 \qquad (1)$$

First Embodiment

Figure 1A:
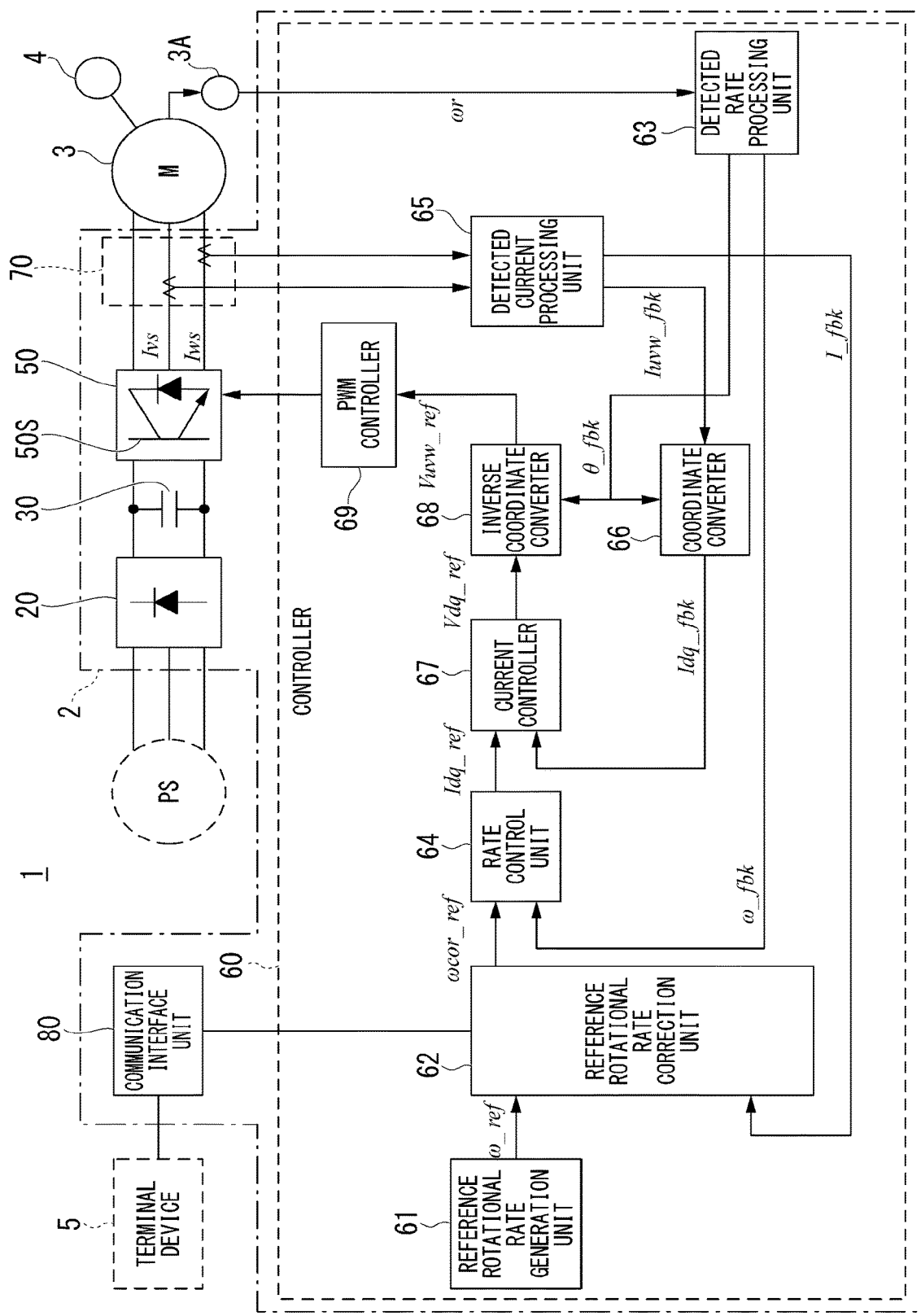
FIG. 1A is a configuration diagram of an electric motor drive system of a first embodiment.

FIG. 1A is a configuration diagram showing an electric motor drive system 1 of the first embodiment. In FIG. 1A, the electric motor drive system 1, a power conversion device 2, an electric motor 3, a mechanical load 4, a terminal device 5, and an AC power supply PS are shown.

The AC power supply PS is a commercial power system, a power generator, or the like, and supplies, for example, three-phase AC power to the power conversion device 2.

The electric motor drive system 1 includes, for example, the power conversion device 2 and the electric motor 3.

The electric motor 3 is, for example, a variable speed motor (M) such as an induction motor. When the three-phase AC power is supplied from the power conversion device 2, the electric motor 3 outputs a rotational driving force to an output shaft and the rotational driving force drives the mechanical load 4 connected to the output shaft. The electric motor 3 may include a rotational rate sensor 3A that detects a rotational rate of the shaft of the electric motor 3. The rotational rate sensor 3A outputs, for example, a detected rotational rate ωr of the shaft of the electric motor 3. The unit of the rotational rate ωr may be "rpm" according to the above-mentioned reference rotational rate. In the following description, the unit may be described without being added. The electric motor 3 and the mechanical load 4 are arranged on a common base (not shown) and are fixed to the base by bolts (not shown) or the like.

The power conversion device 2 generates the three-phase AC power and supplies the generated three-phase AC power to the electric motor 3.

For example, the power conversion device 2 includes a rectifier 20, a capacitor 30, an inverter 50, a controller 60, a current detector 70, and a communication interface unit 80.

The AC power supply PS is connected to an AC side of the rectifier 20, and the capacitor 30 and the inverter 50 are connected to a DC side of the rectifier 20 via a direct current (DC) link. The rectifier 20 converts the AC power supplied from the AC power supply PS into DC power and the capacitor 30 smooths the voltage of the DC power.

The inverter 50 is, for example, a single-phase inverter including one or more switching devices 50S such as insulated gate bipolar transistors (IGBTs). A type of the switching devices 50S is not limited to an IGBT and may be another type. The switching devices 50S of the inverter 50 is subjected to pulse width modulation (PWM) control by the controller 60. The inverter 50 converts DC power supplied from the rectifier 20 into AC power. The inverter 50 supplies three-phase AC power after the conversion to the electric motor 3 connected to an output of the inverter 50 and causes the electric motor to be driven. Phases of the three-phase AC power output by the inverter 50 are referred to as a U phase, a V phase, and a W phase.

For example, the current detector 70 is provided for the V phase line and the W phase line in load power lines connecting the output of the inverter 50 and the electric motor 3 and the power conversion device 2 detects load currents Ivs and Iws that are supplied to windings of the electric motor 3.

For example, the communication interface unit 80 communicates with the terminal device 5 according to the control of the controller 60.

The controller 60 includes, for example, a reference rotational rate generation unit 61, a reference rotational rate correction unit 62, a detected rate processing unit 63, a rate control unit 64, a detected current processing unit 65, a coordinate converter 66, a current controller 67, an inverse coordinate converter 68, and a PWM controller 69.

The reference rotational rate generation unit 61 generates a reference rotational rate ω_ref, which defines the rotational rate of the electric motor 3, and outputs the generated reference rotational rate ω_ref. For example, the reference rotational rate generation unit 61 generates the reference rotational rate ω_ref quantized with prescribed resolution. The above-described prescribed resolution may be the same as the resolution of a corrected reference rotational rate ωcor_ref generated by the reference rotational rate correction unit 62 to be described below. For example, "rpm" which is the same as the unit of the reference rotational rate ω_ref is used as the unit of the corrected reference rotational rate ωcor_ref.

The reference rotational rate correction unit 62 generates a prescribed condition for determining whether or not to correct the reference rotational rate ω_ref to the corrected reference rotational rate ωcor_ref. The reference rotational rate correction unit 62 corrects the reference rotational rate ω_ref to the corrected reference rotational rate ωcor_ref when the prescribed condition is satisfied.

For example, the reference rotational rate correction unit 62 has two inputs, one output, and one communication interface. A first input of the reference rotational rate correction unit 62 is connected to the output of the reference rotational rate generation unit 61 and receives the supply of the reference rotational rate ω_ref from the reference rotational rate generation unit 61. A second input of the reference rotational rate correction unit 62 is connected to the output of the detected current processing unit 65 and receives a current value I_fbk supplied from the detected current processing unit 65.

The reference rotational rate correction unit 62 generates restriction information for restricting the rotational rate in a first step and generates the corrected reference rotational rate ωcor_ref by correcting the reference rotational rate ω_ref using the restriction information in a second step.

For example, in the first step, the reference rotational rate correction unit 62 acquires the current value I_fbk when the electric motor 3 is being driven at any rotational rate lower than or equal to a rated rotational rate of the electric motor 3 and detects a change in the current value I_fbk. The reference rotational rate correction unit 62 generates restriction information for determining that the prescribed condition is satisfied when a magnitude of a specific frequency component of the change in the current value I_fbk is greater than a desired value.

In the second step, the reference rotational rate correction unit 62 generates the corrected reference rotational rate ωcor_ref obtained by correcting the reference rotational rate ω_ref using the above restriction information. Thereby, for example, the reference rotational rate correction unit 62 can cause the electric motor 3 to be driven in a state in which a rotational rate range in which mechanical resonance can occur is avoided. Details of the reference rotational rate correction unit 62 will be described below.

The detected rate processing unit 63 generates and outputs a rotational rate ω_fbk and a phase θ_fbk based on the rotational rate ωr of the shaft of the electric motor 3 detected by the rotational rate sensor 3A. The rotational rate ω_fbk is the rotational rate of the shaft of the electric motor 3 and the unit thereof is "rpm." The phase θ_fbk is an electric angle calculated on the basis of an angle of the shaft of the electric motor 3 and the number of poles of the electric motor 3, and the unit thereof is "radians (rad)."

The rate control unit 64 generates a reference current Idq_ref on the basis of the corrected reference rotational rate ωcor_ref generated by the reference rotational rate correction unit 62 and the rotational rate ω_fbk output from the detected rate processing unit 63. The reference current Idq_ref includes a reference current Id_ref and a reference current Iq ref of a rotor coordinate system having orthogonal d- and q-axes represented by vector values. For example, the rate control unit 64 generates the reference current Idq_ref so that a difference between the corrected reference rotational rate ωcor_ref and the rotational rate ω_fbk becomes 0 for each of the components of the d-axis and the q-axis. Also, the rate control unit 64 may perform field weakening control on the basis of the rotational rate ω_fbk.

The detected current processing unit 65 outputs a current value Iuvw_fbk and the current value I_fbk based on the load current detected by the current detector 70. The current value Iuvw_fbk includes phase currents Iu_fbk, Iv_fbk, and Iw_fbk of the electric motor 3 represented by vector values in a three-phase coordinate space having three axes corresponding to the U phase, the V phase, and the W phase. The current value I_fbk is a scalar value indicating a magnitude of the current value Iuvw_fbk.

The coordinate converter 66 generates a current value Idq_fbk by converting the current value Iuvw_fbk of the three-phase coordinate system into the rotor coordinate system having the d- and q-axes using the phase θ_fbk. The above conversion is referred to as d-q conversion. The rotor coordinate system having the d- and q-axes is, for example, a rotating coordinate system in which an angle formed by a U-phase direction axis and a d-axis of a stator coordinate system, which is a stationary coordinate system, is rotated to a position equal to the phase θ_fbk.

The current controller 67 generates a reference voltage Vdq_ref so that a difference between components of the axes of the reference current Idq_ref and the current value Idq_fbk becomes 0 on the basis of the reference current Idq_ref generated by the rate control unit 64 and the current value Idq_fbk output from the coordinate converter 66.

The inverse coordinate converter 68 generates a reference voltage Vuvw_ref by converting the reference voltage Vdq_ref generated by the current controller 67 from a two-phase coordinate system into a three-phase coordinate system using the phase θ_fbk. In other words, the inverse coordinate converter 68 performs inverse conversion which is the inversion of the above-described d-q conversion with respect to the reference voltage Vdq_ref and generates the reference voltage Vuvw_ref. The above conversion is referred to as inverse d-q conversion.

The PWM controller 69 compares the reference voltage Vuvw_ref generated by the inverse coordinate converter 68 with a carrier signal of a prescribed frequency, and generates a PWM signal for each of the U phase, the V phase, and the W phase. The PWM controller 69 supplies the PWM signal for each of the U phase, the V phase, and the W phase to the inverter 50 and controls switching of the switching devices. For example, when the inverter 50 includes six switching devices, the PWM controller 69 supplies the inverter 50 with six gate control signals for switching the six switching devices.

As described above, the rate control unit 64 performs adjustment so that a difference between the corrected reference rotational rate ωcor_ref and the rotational rate ω_fbk becomes 0, so that the electric motor 3 is driven at the reference rotational rate defined by the corrected reference rotational rate ωcor_ref.

Figure 1B:
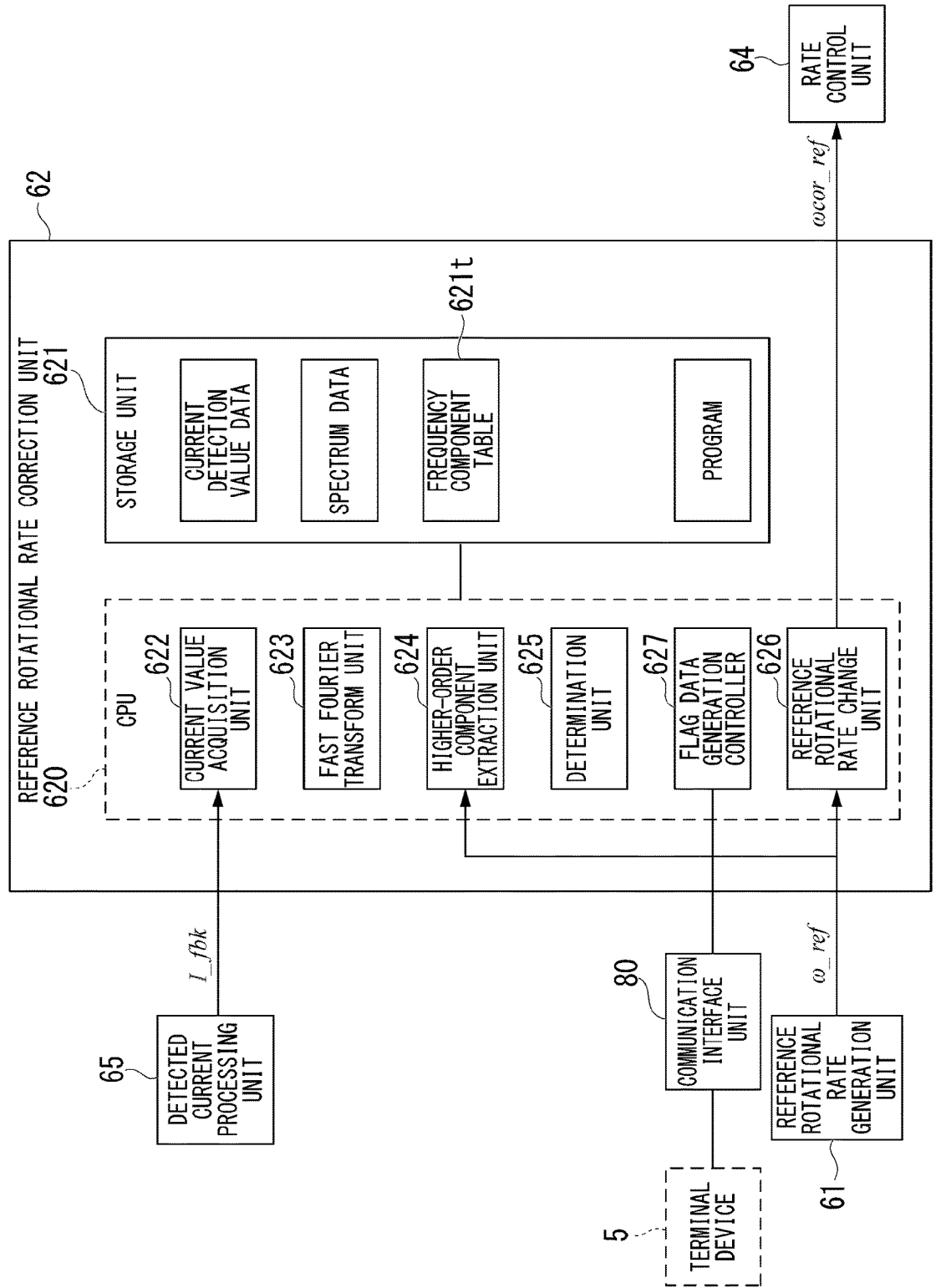
FIG. 1B is a configuration diagram of a reference rotational rate correction unit of the first embodiment.

Next, the reference rotational rate correction unit 62 will be described with reference to FIG. 1B. FIG. 1B is a configuration diagram of the reference rotational rate correction unit 62 of the embodiment.

The reference rotational rate correction unit 62 includes, for example, a storage unit 621, a current value acquisition unit 622, a fast Fourier transform unit 623 (a frequency analysis processing unit), a higher-order component extraction unit 624, a determination unit 625, a reference rotational rate change unit 626, and a flag data generation controller 627.

For example, the storage unit 621 stores current detection value data of the current value I_fbk based on the load current detected by the current value acquisition unit 622, spectrum data generated by the fast Fourier transform unit 623, a frequency component data table 621t, a program of a reference rotational rate correction process, and the like. The storage unit 621 stores the above-described current detection value data as time-series data. Details of the above-described information will be described below.

Each of the current value acquisition unit 622, the fast Fourier transform unit 623, the higher-order component extraction unit 624, the determination unit 625, the reference rotational rate change unit 626, and the flag data generation controller 627 is implemented by, for example, a hardware processor such as a central processing unit (CPU) 620 executing a program (software). Also, some or all of the above components may be implemented by hardware (including a circuit portion; circuitry) such as a large-scale integration (LSI) circuit, an application specific integrated circuit (ASIC), a field-programmable gate array (FPGA), and a graphics processing unit (GPU) or may be implemented by software and hardware in cooperation. The storage unit 621 is implemented by, for example, a hard disk drive (HDD), a flash memory, an electrically erasable programmable read only memory (EEPROM), a read only memory (ROM), a random-access memory (RAM), or the like.

The current value acquisition unit 622 acquires the current value I_fbk from the detected current processing unit 65 and adds data of the acquired current value I_fbk data to the current detection value data of the storage unit 621 as time-series data. Also, data (detection values) of a prescribed number of current values I_fbk corresponding to a prescribed period is acquired from the current detection value data stored in the storage unit 621 and output to the fast Fourier transform unit 623. Also, the current value acquisition unit 622 may perform the acquisition of the current value I_fbk from the current sensor portion 420 and the reading of the data of the current value I_fbk from the storage unit 621 in parallel.

The fast Fourier transform unit 623 performs an FFT process (a fast Fourier transform process) on an amplitude of a load current of the electric motor 3 while the electric motor 3 is being driven at a specific rotational rate using data of the current value I_fbk acquired in a state in which the electric motor 3 is being driven to a constant rate. The fast Fourier transform unit 623 generates a spectrum in the FFT process and adds the generated spectrum to spectrum data of the storage unit 621. The spectrum obtained in the FFT process includes a spectrum of a frequency component of the load current obtained in analysis based on data of a prescribed number of current values I_fbk within a continuous range in a time axis direction from the time-series data of the current value I_fbk while the electric motor 3 is being driven at a specific rotational rate. It is only necessary to determine the number of data elements of the current value I_fbk included within the continuous range in the time axis direction received from the current value acquisition unit 622 by the fast Fourier transform unit 623 for the FFT process so that a component of a desired frequency is included in the spectrum obtained in the FFT process. The fast Fourier transform unit 623 may process the data of the current value I_fbk by performing a prescribed arithmetic process prior to the FFT process so that characteristics of vibrations to be detected are detected more easily. The above-described prescribed arithmetic process may include a process such as envelope processing or a coherent waveform averaging process. In the following description, the fast Fourier transform unit 623 will be described as a portion that generates a spectrum in the FFT process.

The higher-order component extraction unit 624 extracts integer-order harmonic components of the fundamental frequency f for the reference rotational rate ω_ref from the spectrum stored in the spectrum data of the storage unit 621 using a frequency (a fundamental frequency f) of the reference rotational rate ω_ref when the current value I_fbk is acquired from the detected current processing unit 65. For example, the higher-order component extraction unit 624 extracts a third-order component, a fifth-order component, a seventh-order component, and the like when an odd-order harmonic component is extracted. The higher-order component extraction unit 624 adds a value of the extracted harmonic component value to an item of the detection value of the frequency component data table 621t stored in the storage unit 621 in association with the rate value of the rotational rate ω_fbk. The frequency component data table 621t will be described below.

The determination unit 625 determines a magnitude of the harmonic component stored in the frequency component data table 621t of the storage unit 621 on the basis of a predefined threshold value. For example, the above-described threshold value may be set to a value differing according to each order or may be set to a common value between at least two orders. The determination unit 625 adds a determination result to an item of a frequency jump request flag of the frequency component data table 621t of the storage unit 621 in association with the reference rotational rate ω_ref.

The reference rotational rate change unit 626 changes the reference rotational rate ω_ref of the electric motor 3 on the basis of the frequency jump request flag (restriction information) stored in the frequency component data table 621t. The reference rotational rate change unit 626 can avoid mechanical resonance of a frequency at which a signal component has been detected by changing the reference rotational rate ω_ref of the electric motor 3 on the basis of the frequency jump request flag.

The flag data generation controller 627 acquires data of the frequency jump request flag designated by a user by communicating with the terminal device 5 and adds the acquired data of the frequency jump request flag to the frequency component data table 621t of the storage unit 621. The flag data generation controller 627 acquires data of the frequency component data table 621t of the storage unit 621 including the data of the frequency jump request flag and outputs the data to the terminal device 5. Also, the flag data generation controller 627 may omit the acquisition of the data of the frequency jump request flag designated by the user. Alternatively, the flag data generation controller 627 may initialize the frequency jump request flag to a predetermined state at a timing designated by the user.

(Frequency Component Data Table 621t)

Figures 2, 3:
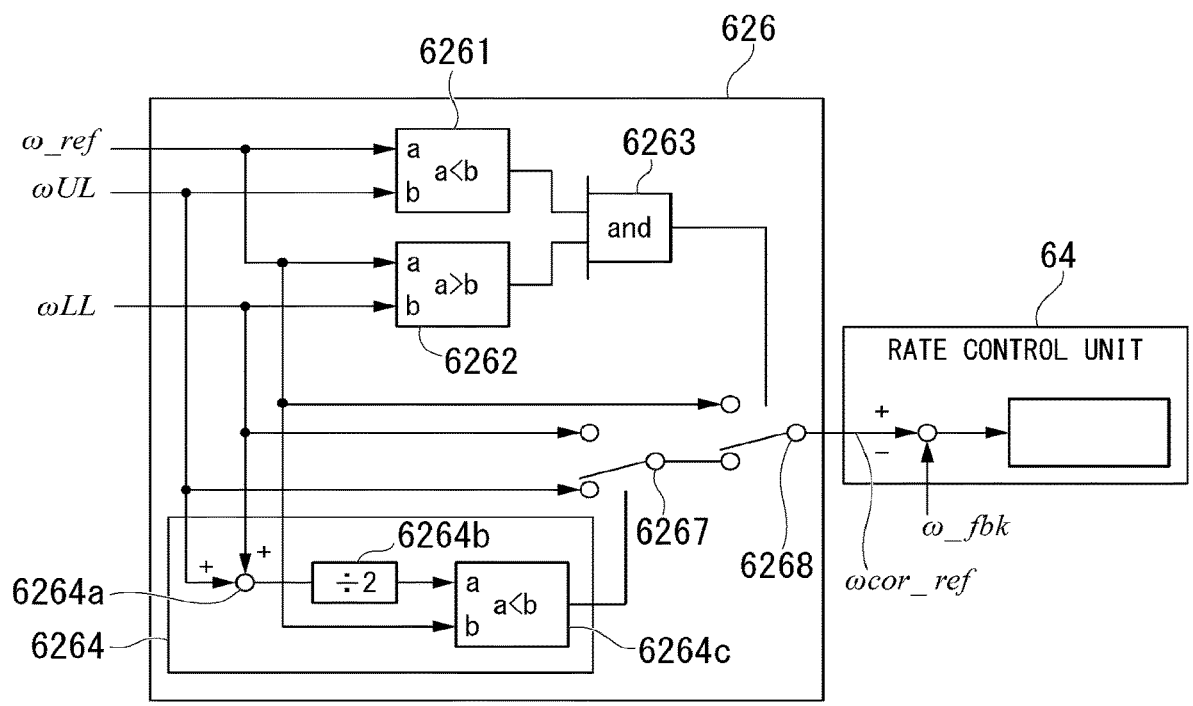
FIG. 2 is a diagram for describing a frequency component data table of the first embodiment.
FIG. 3 is a configuration diagram of a reference rotational rate change unit of the first embodiment.

FIG. 2 is a diagram for describing the frequency component data table 621t of the first embodiment. The frequency component data table 621t shown in FIG. 2 includes items such as a reference rotational rate (ω %), harmonic detection values (a 3f detection value, a 5f detection value, and a 7f detection value), and frequency jump request flags (3fjr, 5fjr, and 7fjr), and the like.

In the item of reference rotational rate (ω %), a value capable of being used as the reference rotational rate of the electric motor 3 is stored. For example, the value of the item of the reference rotational rate (w %) becomes a percentage of a value normalized using a rated rotational rate. Assuming that the value of the reference rotational rate (ω %) in the stopped state becomes 0%, the value of the reference rotational rate (ω %) when the rated rotational rate is designated in a first rotation direction becomes 100%. The resolution of quantization of the example shown in FIG. 2 is defined as, for example, 1%. In the reference rotational rate (ω %), values from 1% to 100% are stored in ascending order. Although not shown, it is only necessary to define a negative value as in the case of the positive value described above when the electric motor 3 is rotated in a reverse direction. The value of the reference rotational rate (w %) of the frequency component data table 621t is referred to when it is determined whether or not to use the reference rotational rate ω_ref of the electric motor 3 for control.

The item of the harmonic detection value is indicated by the magnitude of the odd-order harmonic component included in the load current I_fbk when the frequency corresponding to the reference rotational rate ω_ref is set as the fundamental frequency f. The fundamental frequency f included in the above-described load current I_fbk and the reference rotational rate (ω %) have a relationship shown in the following Eq. (2).

$$f(Hz) = |(\text{rated rotational rate (rpm)}/60) \times \text{reference rotational rate } (\omega\ \%)| \quad (2)$$

For example, the load current I_fbk is detected when the electric motor 3 is driven at the reference rotational rate ω_ref having a value of ω %. For example, the item of the harmonic detection value includes a plurality of lower-level items. The plurality of lower-level items include a 3f detection value, a 5f detection value, a 7f detection value, and the like. The items of the 3f detection value, the 5f detection value, and the 7f detection value described above correspond to the third-order, fifth-order, and seventh-order harmonic components, respectively. For example, the values of items of the 3f detection value, the 5f detection value, and the 7f detection value described above may be defined as follows. A magnitude (an amplitude) of the frequency component including the fundamental frequency f when the electric motor 3 is rotating at the rotational rate based on the reference rotational rate (ω %) is used as a reference value and a magnitude thereof is set to 100%. In the values of the fields of the 3f detection value, the 5f detection value, and the 7f detection value, a magnitude (an amplitude) of an odd-order harmonic component to a magnitude (an amplitude) of the fundamental frequency f when the electric motor 3 is rotating at a rotational rate based on a prescribed reference rotational rate (ω %) is represented by a percentage. As described above, the magnitude of the odd-order harmonic component is normalized on the basis of the magnitude of the frequency component of the reference rotational rate co %.

The item of the frequency jump request flag includes a plurality of lower-level items. The plurality of lower-level items include 3fjr, 5fjr, 7fjr, and the like. 3fjr, 5fjr, and 7fjr are frequency jump request flags generated on the basis of third-order, fifth-order, and seventh-order harmonic components, respectively.

The frequency jump request flag is a flag indicating that a current value larger than a prescribed value has been detected due to an influence of mechanical resonance or the like. For example, the frequency jump request flag indicates that a current value larger than a prescribed value has been detected in a specific frequency component if the flag is turned on and indicates there is a possibility of a resonance point of a mechanical system in which the driving of the electric motor 3 should be limited. The frequency jump request flag indicates that a current value larger than a prescribed value has not been detected in a specific frequency component when the flag is turned off and indicates that the resonance point of the mechanical system in which the driving of the electric motor 3 is restricted has not been detected. The setting of the frequency jump request flag will be described below.

In 3fjr, 5fjr, and 7fjr of the reference rotational rate ω %, determination results of the third-, fifth-, and seventh-harmonic components in the reference rotational rate ω % are stored. The above-described determination result is indicated by "yes" and "no." "Yes" indicates that a magnitude of the above-described odd-order harmonic component has exceeded a predetermined threshold value and "no" indicates that the magnitude of the above-described odd-order harmonic component has not exceeded the prescribed threshold value.

For example, in a range in which the reference rotational rate ω % is from 24 to 26, the value in the field of the 3f detection value exceeds 3% determined to be the above-described prescribed value. The values in the other fields of the 3f detection values, the 5f detection values, and the 7f detection values within the frequency component data table 621*t* are 3% or less. For example, when the threshold value for use in the determination is predefined to be 3% as the above-described prescribed value, "yes" is stored in the field of 3fjr of the above range when it is determined that the magnitude of the 3f detection value is larger than the threshold value in the range in which the above-described reference rotational rate ω % is from 24 to 26. "No" is stored in the other fields of 3fjr, 5fjr, and 7fjr within the frequency component data table 621*t*. Data of a range in which the reference rotational rate ω % in which "yes" is stated in the field of the determination result is from 24 to 26 indicates that there is a possibility that the vibrations of the electric motor 3 or the like will be large.

For example, the determination unit 625 identifies a reference rotational rate (ω %) at which a relatively large harmonic component has been detected and a reference rotational rate (ω %) at which a relatively small harmonic component has been detected using the frequency component data table 621*t*. When a relatively large harmonic component has been detected, the range in which the relatively large harmonic component has been detected can be regarded as the resonance range of the mechanical system. Thereby, the determination unit 625 identifies reference rotational rates (ω %) of a lower limit rate ωLL and an upper limit rate ωUL in the range in which a relatively large harmonic component has been detected. In the case of the frequency component data table 621*t* shown in FIG. 2, the lower limit rate ωLL based on the reference rotational rate becomes 24% and the upper limit rate ωUL based on the reference rotational rate becomes 26%.

The reference rotational rate change unit 626 may perform control for preventing the resonance from occurring in the electric motor 3 by adjusting the reference rotational rate ω_ref of the electric motor 3 so that a range in which the frequency jump request flag determined on the basis of a determination result of the determination unit 625 is turned on is avoided.

Next, the method of setting the frequency jump request flag will be described.

The frequency jump request flag may be preset by the user or may be set on the basis of a vibration generation situation when the electric motor 3 has been actually operated.

For example, the reference rotational rate correction unit 62 sets the frequency jump request flag in a plurality of setting methods including a first method and a second method to be described below.

According to the first method, the flag data generation controller 627 receives data related to the frequency jump request flag fixedly set from the terminal device 5 that is operated by the user. The reference rotational rate correction unit 62 may use the above data for reference rotational rate correction.

For example, the user may determine the frequency jump request flag so that a wide frequency band is identified as a frequency band in which resonance can occur in anticipation of a safety factor so that vibrations due to resonance do not occur. The user sets the frequency jump request flag in the reference rotational rate correction unit 62 using the terminal device 5. The flag data generation controller 627 of the reference rotational rate correction unit 62 receives data related to the frequency jump request flag from the terminal device 5, adds the data related to the frequency jump request flag to the frequency jump request flag of the frequency component data table 621*t*, and set a state of the frequency jump request flag designated by the user. Thereby, the reference rotational rate correction unit 62 can change the frequency jump request flag of the desired reference rotational rate ω % to a desired value and can reduce the number of times the setting is iterated after the frequency jump request flag is set. Although there is dependence on content designated by the user, the range of the reference rotational rate excluded from the selection target tends to be continuous and the range of the reference rotational rate excluded from the selection target tends to be wide. Also, the above first method is not essential for the present embodiment and can be deleted.

According to the second method, the reference rotational rate correction unit 62 may set data (restriction information) related to the frequency jump request flag on the basis of the vibration generation situation when the electric motor 3 has been actually operated.

For example, when the electric motor 3 mechanically resonates, the load current I_fbk of the electric motor 3 changes due to vibrations caused by the resonance. It is only necessary for the reference rotational rate correction unit 62 to detect a situation of occurrence of vibrations indirectly by detecting a change in the load current I_fbk and correct the reference rotational rate ω_ref of the electric motor 3 using the frequency jump request flag so that a resonance point (a resonance frequency) of the mechanical system is avoided on the basis of a detection result. The change in the load current I_fbk to be detected indicates that the magnitude of the odd-order harmonic component of the reference rotational rate (ω %) exceeds a predetermined threshold value.

Therefore, the reference rotational rate correction unit 62 identifies whether or not the reference rotational rate (ω %) is a reference rotational rate (ω %) at which the electric motor 3 can be suitably driven by determining whether or not the magnitude of the odd-order harmonic component for the frequency of the reference rotational rate (ω %) included in the load current I_fbk exceeds the predetermined threshold value. It is only necessary for the reference rotational rate correction unit 62 to use the data of the load current I_fbk detected when the electric motor 3 is driven at a prescribed reference rotational rate for the above-described determination.

Also, the reference rotational rate correction unit 62 sets the frequency jump request flag after at least the electric motor 3 and the mechanical load 4 of the electric motor drive system 1 are installed on the base and in a step before control by the electric motor drive system 1 is started (for example, a trial operation step). At this time, the reference rotational rate generation unit 61 causes the reference rotational rate $\omega\_ref$ of the electric motor 3 to be changed at a degree of the predefined reference rotational rate ($\omega$ %) in order from the low-rate range to the high-rate range, or vice versa, i.e., from the high-rate range to the low-rate range. The reference rotational rate generation unit 61 fixes the reference rotational rate $\omega\_ref$ of the electric motor 3 to a specific reference rotational rate ($\omega$ %) and collects the load current $I\_fbk$ while the electric motor 3 is operating to a constant rate or a substantially constant rate. If the data of the load current $I\_fbk$ collected from a timing when the reference rotational rate $\omega\_ref$ of the electric motor 3 is changed to a timing when the electric motor 3 operates at a constant rate is included in data of an analysis target of the FFT process, a result of the FFT process in this case may be different from a result of the FFT process when the electric motor 3 is driven at a constant rate or a substantially constant rate.

The reference rotational rate correction unit 62 sets the frequency jump request flag on the basis of the load current $I\_fbk$ in the above-described method. Also, the reference rotational rate change unit 626 does not change the value of the corrected reference rotational rate $\omega cor\_ref$ for a period in which the data of the current $I\_fbk$ is continuously collected for a prescribed time period or a period until data of a predetermined number of load currents $I\_fbk$ is collected. Also, for example, the above-described high-rate range refers to a region where the rotational rate is relatively high (a region having a high frequency) in a region where the rate of the electric motor 3 is less than or equal to the rated rate.

Also, it is only necessary for the reference rotational rate correction unit 62 to stop a normal operation of the electric motor drive system 1 for a predetermined specific period after the start of operation of the electric motor drive system 1 and collect information of each frequency at the rotational rate in association with the rotational rate of the electric motor 3 that changes according to control and the fundamental frequency of the AC. Thereby, it is possible to reduce an influence of an environment and the like that have changed during operation.

Also, the reference rotational rate correction unit 62 may collect the above-described information while the electric motor 3 is being driven during the normal operation of the electric motor drive system 1. Although the state of mechanical resonance changes when the load condition due to the mechanical load 4 changes in the above-described case, it is possible to detect a change in the load condition based on the mechanical load 4 by appropriately updating the state of the frequency jump request flag and setting the state to the latest state. Thereby, it is possible to optimize the state of the frequency jump request flag.

Next, details of the reference rotational rate change unit 626 will be described with reference to FIG. 3. FIG. 3 is a configuration diagram of the reference rotational rate change unit 626 of the first embodiment.

The reference rotational rate change unit 626 generates a corrected reference rotational rate $\omega cor\_ref$ on the basis of the reference rotational rate $\omega\_ref$, the lower limit rate $\omega LL$, and the upper limit rate $\omega UL$. The lower limit rate $\omega LL$ and the upper limit rate $\omega UL$ are examples of data generated based on the frequency jump request flag. Also, the lower limit rate $\omega LL$ and the upper limit rate $\omega UL$ may be referred to as a lower limit frequency and an upper limit frequency, respectively.

For example, the reference rotational rate change unit 626 includes a comparator 6261, a comparator 6262, an AND operator 6263, a rate switching controller 6264, a selector 6267, and a selector 6268.

The comparator 6261 is a two-input comparator and compares the reference rotational rate $\omega\_ref$ supplied to the first input with the upper limit rate $\omega UL$ supplied to the second input. According to a comparison result, the comparator 6261 outputs a logic value of 1 when the reference rotational rate $\omega\_ref$ is smaller than the upper limit rate $\omega UL$ and outputs a logic value of 0 when the reference rotational rate $\omega\_ref$ is greater than or equal to the upper limit rate $\omega UL$.

The comparator 6262 is a two-input comparator and compares the reference rotational rate $\omega\_ref$ supplied to the first input with the lower limit rate $\omega LL$ supplied to the second input. According to a comparison result, the comparator 6262 outputs a logic value of 1 when the reference rotational rate $\omega\_ref$ is larger than the lower limit rate $\omega LL$ and outputs a logic value of 0 when the reference rotational rate $\omega\_ref$ is less than or equal to the lower limit rate $\omega LL$.

The AND operator 6263 performs a logical AND operation on two input values. The AND operator 6263 outputs an output signal (AND) indicating a logical product of the comparison result of the comparator 6261 supplied to the first input and the comparison result of the comparator 6262 supplied to the second input. When the comparison results of the comparator 6261 and the comparator 6262 are both 1, a logic value of 1 is output. Otherwise, a logic value 0 is output.

The rate switching controller 6264 generates an output signal (COMP3) for switching the reference rotational rate $\omega\_ref$ so that the rotational rate jumps over a rotational rate in a resonance range. For example, the rate switching controller 6264 generates the output signal (COMP3) using an average value of the lower limit rate $\omega LL$ supplied to the first input and the upper limit rate $\omega UL$ supplied to the second input, thereby switching the reference rotational rate $\omega\_ref$ so that the rotational rate jumps over the rotational rate in the resonance range.

For example, the rate switching controller 6264 includes an adder 6264a, a divider 6264b, and a comparator 6264c. The adder 6264a adds the lower limit rate (DLL to the upper limit rate $\omega UL$. The divider 6264b calculates the above-described average value by dividing the sum of the lower limit rate $\omega LL$ and the upper limit rate $\omega UL$ by 2. The comparator 6264c compares the average value of the lower limit rate $\omega LL$ and the upper limit rate $\omega UI$, supplied to the first input with the reference rotational rate $\omega\_ref$ supplied to the second input. According to a comparison result, the comparator 6264c outputs a logic value of 1 when the reference rotational rate $\omega\_ref$ is larger than the above-described average value and outputs a logic value of 0 when the reference rotational rate $\omega\_ref$ is less than or equal to the above-described average value.

The selector 6267 selects one of the two input values according to control and outputs a selected signal $\omega j$. The lower limit rate $\omega LL$ is supplied to the first input of the selector 6267, the upper limit rate $\omega UL$ is supplied to the second input, and the output signal (COMP3) of the rate switching controller 6264 is supplied to the control input as a control signal. The selector 6267 selects the lower limit rate $\omega LL$ of the first input when the logic value of the output signal (COMP3) of the rate switching controller 6264 is 1, selects the upper limit rate ωUL of the second input when the logic value of the output signal (COMP3) is 0, and outputs a selection result as the signal ωj.

The selector 6268 selects one of the two input values according to control and outputs the selected signal as the corrected reference rotational rate ωcor_ref. The reference rotational rate ω_ref is supplied to the first input of the selector 6268, the signal ωj output by the selector 6267 is supplied to the second input, and an output signal (AND) of the AND operator 6263 is supplied as a control signal to a control input. The selector 6268 selects the reference rotational rate ω_ref of the first input when the logic value of the output signal (AND) of the AND operator 6263 is 1, selects the signal ωj output by the selector 6267 of the second input when the logic value of the output signal (AND) is 0, and outputs a selection result as the corrected reference rotational rate ωcor_ref. Also, when the selector 6268 has selected the first input, a signal output as the corrected reference rotational rate ωcor_ref becomes the reference rotational rate ω_ref.

Next, an operation of the reference rotational rate change unit 626 will be described with reference to FIG. 4.

Figure 4:
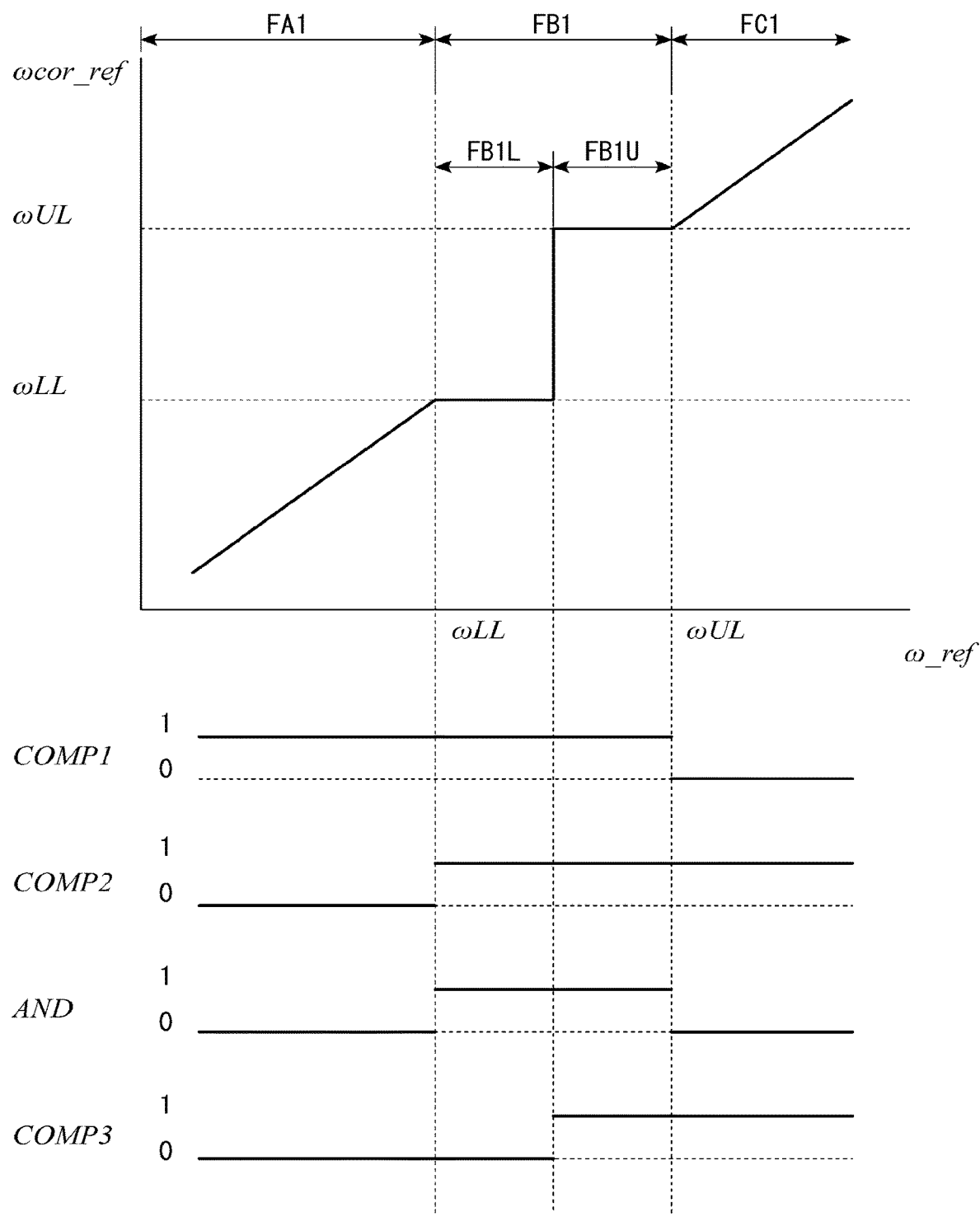
FIG. 4 is a diagram for describing the reference rotational rate change unit of the first embodiment.

FIG. 4 is a diagram for describing the reference rotational rate change unit 626 of the first embodiment. A graph shown on the upper side of FIG. 4 shows a relationship between the reference rotational rate ω_ref (a horizontal axis) and the corrected reference rotational rate ωcor_ref (a vertical axis). On the lower side of FIG. 4, logics of the output signal (COMP1) of the comparator 6261, the output signal (COMP2) of the comparator 6262, the output signal (AND) of the AND operator 6263, and the output signal (COMP3) of the comparator 6264c within the rate switching controller 6264 are shown.

When the reference rotational rate ω_ref is in a region FA1 lower than the lower limit rate ωLL and the reference rotational rate ω_ref is in a region FC1 higher than the upper limit rate ωUL, the reference rotational rate change unit 626 outputs the value of the reference rotational rate ω_ref as the corrected reference rotational rate ωcor_ref according to the output signal (AND) of the AND operator 6263 as it is. In the case of a region FB1 other than the above, the reference rotational rate change unit 626 outputs a value different from the reference rotational rate ω_ref as the corrected reference rotational rate ωcor_ref.

Also, a rotational rate (a first rotational rate) within the region FB1 becomes a value for a frequency at which a signal component having a magnitude exceeding a predetermined prescribed value has been detected. Rotational rates (second rotational rates) within the regions FA1 and FC1 become values for a frequency at which a signal component having a magnitude exceeding the predetermined prescribed value has not been detected.

For example, in the region FB1L of the region FB1 where the logic of the output signal (COMP3) output by the comparator 6264c is 0, the reference rotational rate change unit 626 outputs the lower limit rate ωLL as the corrected reference rotational rate ωcor_ref. In the region FB1U of the region FB1 where the logic of the output signal (COMP3) output by the comparator 6264c is 1, the reference rotational rate change unit 626 outputs the upper limit rate ωUL as the corrected reference rotational rate ωcor_ref.

According to the embodiment, even if the reference rotational rate ω_ref is controlled so that it increases monotonically from the region FA1 to the region FC1, if the reference rotational rate ω_ref is a value within the region FB1, the reference rotational rate change unit 626 replaces the value of the reference rotational rate ω_ref with a value of either the lower limit rate ωLL or the upper limit rate ωUL in accordance with the magnitude of the reference rotational rate ω_ref without outputting the value of the reference rotational rate ω_ref and outputs the value of either the lower limit rate ωLL or the upper limit rate ωUL as the corrected reference rotational rate ωcor_ref.

According to the above-described embodiment, the power conversion device 2 includes an inverter 50, a current detector 70, a fast Fourier transform unit 623, a storage unit 621, a determination unit 625, a reference rotational rate change unit 626, and a rate control unit 64. The inverter 50 converts DC power into AC power by causing the switching devices to perform a switching operation and supplies the AC power to the electric motor 3. The current detector 70 detects the load current flowing from the inverter 50 to the winding of the electric motor 3. The fast Fourier transform unit 623 calculates a frequency component defined on the basis of fundamental waves of an AC of the load current detected by the current detector 70. The storage unit 621 stores restriction information for excluding a reference rotational rate for a specific rotational rate from reference rotational rates for designating the rotational rate of the electric motor 3. The determination unit 625 determines a frequency at which a signal component having a magnitude exceeding a prescribed value has been detected among frequency components of the load current of the electric motor 3 calculated by the fast Fourier transform unit 623, generates restriction information for excluding a reference rotational rate for a rotational rate corresponding to the frequency at which the signal component has been detected according to the determination, and causes the storage unit 621 to store the generated restriction information. The reference rotational rate change unit 626 changes a reference rotational rate of the electric motor 3 on the basis of the limiting information stored in the storage unit 621 so that mechanical resonance of the frequency at which the signal component has been detected is avoided. The rate control unit 64 controls the inverter 50 and causes the electric motor to be driven at a rotational rate based on the reference rotational rate changed by the reference rotational rate change unit 626. Thereby, the rotational rate at which the inverter 50 drives the electric motor 3 is based on the reference rotational rate changed on the basis of the restriction information and the electric motor 3 can be driven so that vibrations due to mechanical resonance do not occur.

Second Embodiment

A second embodiment will be described with reference to FIGS. 5 and 6.

The reference rotational rate correction unit 62 of the controller 60 in the power conversion device 2 of the first embodiment includes the reference rotational rate change unit 626. On the other hand, a reference rotational rate correction unit 62A of a controller 60 in a power conversion device 2 of the present embodiment includes a reference rotational rate change unit 626A. Hereinafter, the reference rotational rate change unit 626A will be described.

Figure 5:
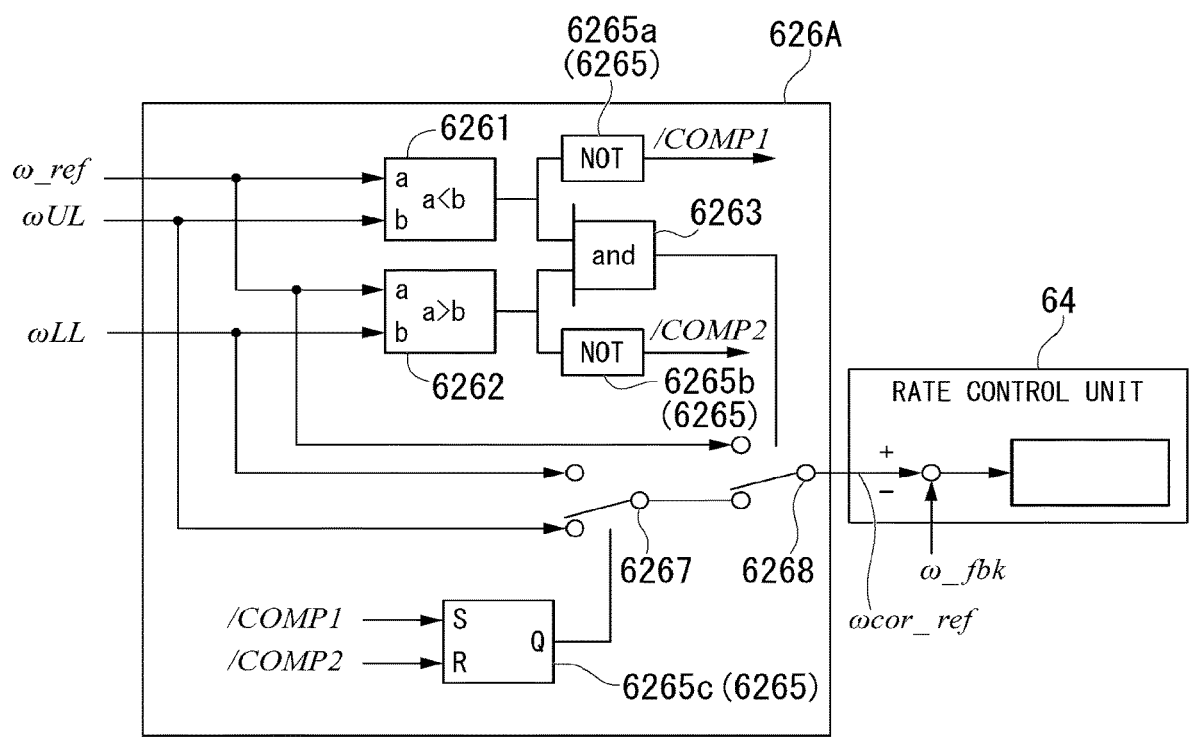
FIG. 5 is a configuration diagram of the reference rotational rate change unit of a second embodiment.

FIG. 5 is a configuration diagram of the reference rotational rate change unit 626A of the second embodiment.

The reference rotational rate change unit 626A includes a rate switching controller 6265 instead of the rate switching controller 6264 of the reference rotational rate change unit 626 described above.

The rate switching controller 6265 is configured to generate a corrected reference rotational rate ωcor_ref that jumps over a value in a limit range from a lower limit rate ωLL supplied to a first input to an upper limit rate ωUL supplied to a second input.

The rate switching controller 6265 includes, for example, a NOT operator 6265a, a NOT operator 6265b, and a latch 6265c. The NOT operator 6265a inverts an output logic of a comparator 6261 and outputs the inverted logic. The NOT operator 6265b inverts an output logic of the comparator 6262 and outputs the inverted logic. The latch 6265c is a set-reset type latch. An output of the NOT operator 6265a is connected to a set input and an output of the NOT operator 6265b is connected to a reset input. A control input of the selector 6267 is connected to an output Q of the latch 6265c.

A selector 6267 selects the lower limit rate ωLL of the first input when the latch 6265c outputs a logic value of 1 from the output Q and selects the upper limit rate ωUL of the second input when the latch 6265c outputs a logic value of 0.

Next, an operation of the reference rotational rate change unit 626A will be described with reference to FIG. 6.

Figure 6:
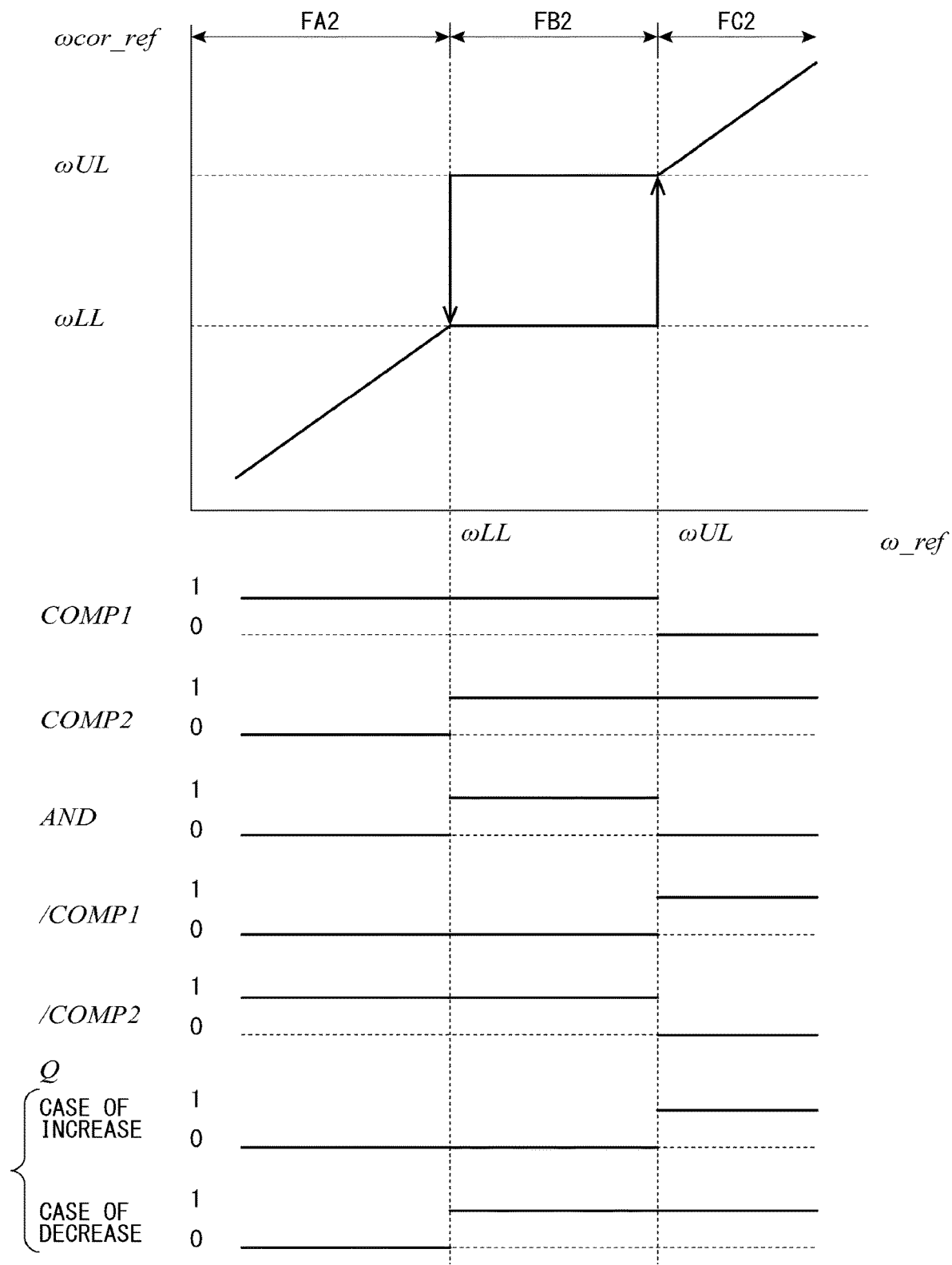
FIG. 6 is a diagram for describing the reference rotational rate change unit of the second embodiment.

FIG. 6 is a diagram for describing the reference rotational rate change unit 626A of the second embodiment. A graph shown on the upper side of FIG. 6 shows a relationship between a reference rotational rate ω_ref (a horizontal axis) and a corrected reference rotational rate ωcor_ref (a vertical axis). On the lower side of FIG. 6, logics of an output signal (COMP1) of the comparator 6261, an output signal (COMP2) of a comparator 6262, an output signal (AND) of an AND operator 6263, and an output signal (/COMP1) of the NOT operator 6265a, an output signal (/COMP2) of the NOT operator 6265b, and an output signal (Q) of the latch 6265c within the rate switching controller 6265 are shown. The output signal (Q) of the latch 6265c has two results according to whether the value of the reference rotational rate ω_ref tends to increase or decrease.

When the reference rotational rate ω_ref is in a region FA2 lower than the lower limit rate ωLL and when the reference rotational rate ω_ref is in a region FC2 higher than the upper limit rate ωUL, the reference rotational rate change unit 626 outputs the value of the reference rotational rate ω_ref as the corrected reference rotational rate ωcor_ref according to an output value of the AND operator 6263. In the case of a region FB2 other than the above, the reference rotational rate change unit 626 outputs a value different from the reference rotational rate ω_ref as the corrected reference rotational rate ωcor_ref.

For example, the latch 6265c outputs a logic value of 0 during a period until the reference rotational rate ω_ref exceeds the upper limit value (the upper limit rate ωUL) of the region FB2 from the region FA2 where the reference rotational rate ω_ref is relatively low. During the above period, the latch 6265c outputs a logic value of 0, so that the selector 6267 selects the lower limit rate ωLL of the first input. On the other hand, when the reference rotational rate ω_ref exceeds the upper limit value of the region FB2 and enters the region FC2, the NOT operator 6265a inverts the logic value output by the comparator 6261. Accordingly, the latch 6265c inverts the output and outputs a logic value of 1. Thereby, the selector 6267 selects the upper limit rate ωUL of the second input.

On the other hand, the latch 6265c outputs a logic value of 1 during a period until the reference rotational rate ω_ref exceeds the lower limit value (the lower limit rate ωLL) of the region FB2 from the region FC2 where the reference rotational rate ω_ref is relatively high. During the above period, the latch 6265c outputs the logic value of 1, so that the selector 6267 selects the upper limit rate ωUL of the second input. On the other hand, when the reference rotational rate ω_ref exceeds the lower limit value of the region FB2 and enters the region FA2, the NOT operator 6265a inverts the logic value output by the comparator 6261. Accordingly, the latch 6265c inverts the output and outputs a logic value of 0. Thereby, the selector 6267 selects the lower limit rate ωLL of the first input.

At both the time when the reference rotational rate ω_ref is changed from the region FA2 to the region FC2 across the region FB2 including the rotational rate at which the electric motor 3 resonates easily and the time when the reference rotational rate ωref is changed from the region FC2 to the region FA2, the reference rotational rate change unit 626A has hysteresis in which the corrected reference rotational rate ωcor_ref is output so that the reference rotational rate ω_ref included in the region FB2 is not output.

According to the embodiment, even if the reference rotational rate ω_ref is controlled so that it increases monotonically from the region FA2 to the region FC2, the reference rotational rate change unit 626 does not output a value of the reference rotational rate ω_ref corresponding to the region FB2 where there is hysteresis as the corrected reference rotational rate ωcor_ref. Alternatively, the reference rotational rate change unit 626 outputs either the lower limit rate ωLL or the upper limit rate ωUL in accordance with a magnitude of the reference rotational rate ω_ref.

According to the above-described embodiment, by providing hysteresis in a limit range of the reference rotational rate, the electric motor 3 is controlled using a reference rotational rate avoiding a range of a region thereof, so that it is possible to obtain effects similar to those of the first embodiment.

Third Embodiment

A third embodiment will be described with reference to FIGS. 7 and 8.

In the first embodiment, an example in which the region FB1 includes a rotational rate at which resonance is easy has been described. In the present embodiment, an example that can be applied when there are a plurality of regions including a rotational rate at which resonance is easy in a change range of a rotational rate of an electric motor 3 will be described.

Figure 7:
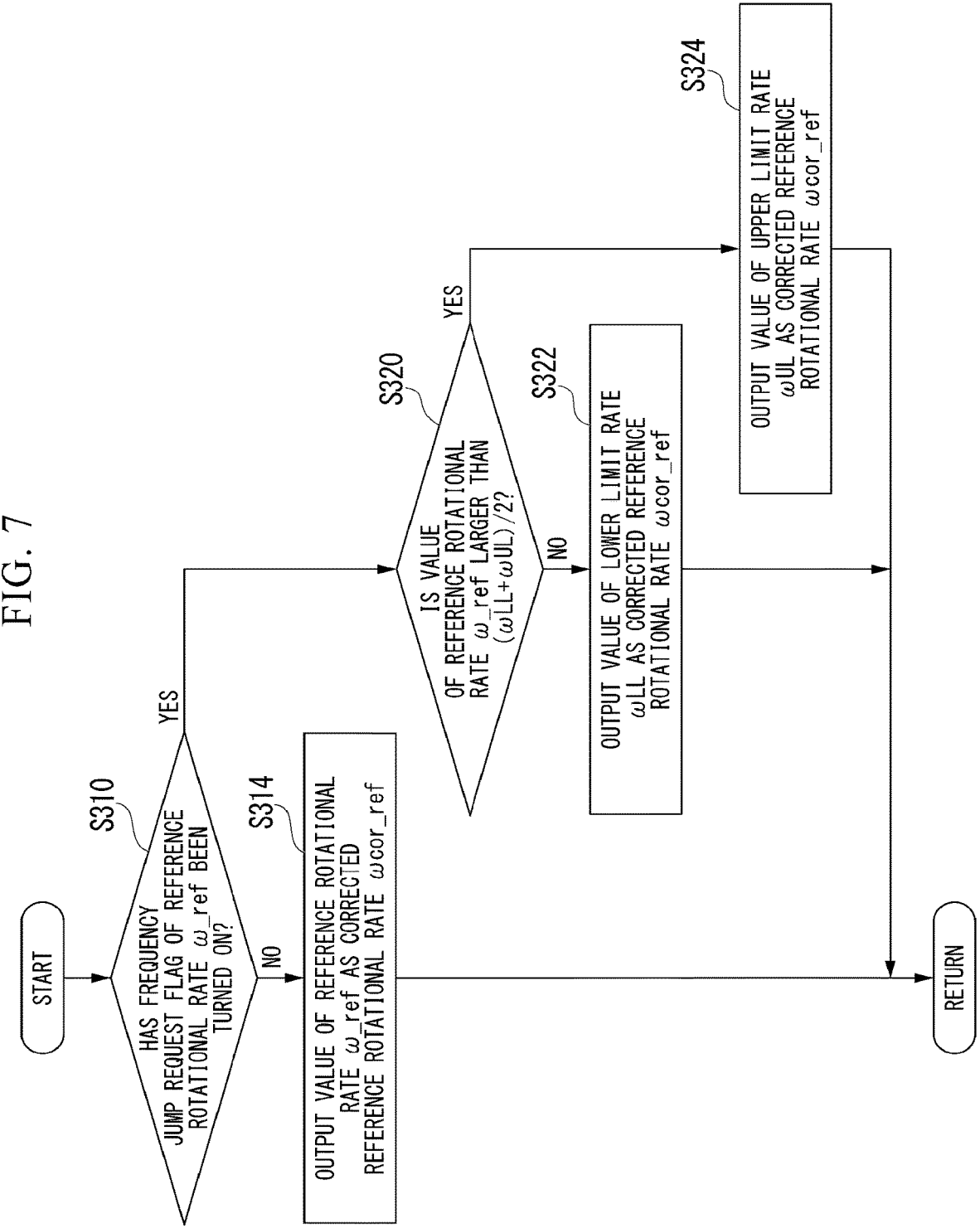
FIG. 7 is a flowchart of a reference rotational rate change process of a third embodiment.

FIG. 7 is a flowchart of a reference rotational rate change process of the third embodiment.

The reference rotational rate correction unit 62 of the first embodiment is read as a reference rotational rate correction unit 62B.

First, the reference rotational rate correction unit 62B determines whether or not a value defined by a reference rotational rate ω_ref is a value included in a region where a frequency jump request flag is turned on (referred to as a resonance detection region). For example, the reference rotational rate correction unit 62B determines whether or not the frequency jump request flag of the reference rotational rate ω_ref has been turned on with reference to a frequency component data table 621t (S310).

When the frequency jump request flag of the reference rotational rate ω_ref has not been turned on, the reference rotational rate correction unit 62B outputs a value of the reference rotational rate ω_ref as a corrected reference rotational rate ωcor_ref (S314) and a series of processing steps ends.

When the frequency jump request flag of the reference rotational rate ω_ref has been turned on, i.e., within a restriction region, the reference rotational rate correction unit 62B determines whether or not a value of the reference rotational rate ω_ref is larger than an average value of a lower limit rate ωLL and an upper limit rate ωUL using both the lower limit rate ωLL and the upper limit rate ωUL of the restriction region (S320). A calculation expression (ωLL+ωUL)/2 indicates the average value of the lower limit rate ωLL and the upper limit rate ωUL.

When the value of the reference rotational rate ω_ref is not larger than the average value of the lower limit rate ωLL and the upper limit rate ωUL, the reference rotational rate correction unit 62B outputs the value of the lower limit rate ωLL as the corrected reference rotational rate ωcor_ref (S322) and a series of processing steps ends.

When the value of the reference rotational rate ω_ref is larger than the average value of the lower limit rate ωLL and the upper limit rate ωUL, the reference rotational rate correction unit 62B outputs the value of the upper limit rate ωUL as the corrected reference rotational rate ωcor_ref (S324) and a series of processing steps ends.

Figure 8:
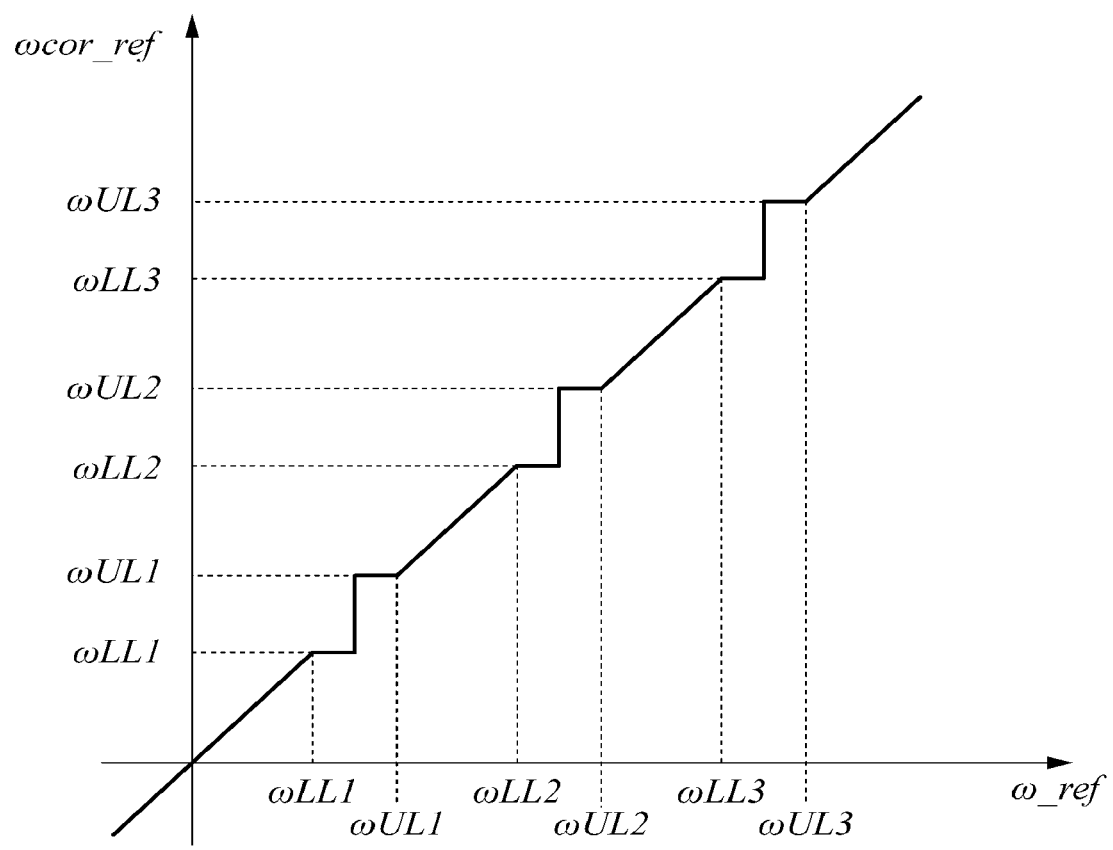
FIG. 8 is a diagram for describing the reference rotational rate change process of the third embodiment.

FIG. 8 is a diagram for describing a change in the reference rotational rate according to the third embodiment. A graph shown on the upper side of FIG. 8 shows a relationship between the reference rotational rate ω_ref (a horizontal axis) and the corrected reference rotational rate ωcor_ref (a vertical axis). The relationship between the reference rotational rate ω_ref and the corrected reference rotational rate ωcor_ref shown in the graph of FIG. 8 is as shown in FIG. 4 described above.

Three restriction regions are shown in the graph of FIG. 8. The above three restriction region are referred to as first, second, and third restriction regions in ascending order of rotational rate. The first restriction region is a range from a lower limit rate ωLL1 to an upper limit rate ωUL1. The second restriction region is a range from a lower limit rate ωLL2 to an upper limit rate ωUL2. The third restriction region is a range from a lower limit rate ωLL3 to an upper limit rate ωUL3. The three restriction regions are independent without overlapping ranges.

For example, the value of the reference rotational rate ω_ref may be monotonically increased from a value smaller than that of the first restriction region to a value larger than that of the third restriction region and a monotonous increase may be interrupted during the monotonous increase described above. Further, a value of the starting point may be any value other than the value smaller than that of the first restriction region.

Also, in contrast to the above, the value of the reference rotational rate ω_ref may be monotonically decreased from a value larger than that of the third restriction region to a value smaller than that of the first restriction region, a monotonous phenomenon may be interrupted during the monotonous decrease as described above, or the value of the starting point may be any value other than a value larger than that of the third restriction region.

According to the embodiment, the reference rotational rate correction unit 62B performs correction from the reference rotational rate ω_ref to the corrected reference rotational rate ωcor_ref by changing the value of the reference rotational rate ω_ref to the lower limit rate ωLL and the upper limit rate ωUL defined for each restriction region.

According to the above-described processing procedure, in addition to achieving effects similar to those of the first embodiment, the present invention is also applicable to a case in which there are a plurality of restriction regions including rotational rates at which resonance is easy.

Fourth Embodiment

A fourth embodiment will be described with reference to FIGS. 9 and 10.

In the second embodiment, an example in which the region FB2 includes a rotational rate at which resonance is easy has been described. In the present embodiment, an example in which the present invention can be applied when there are a plurality of regions including a rotational rate at which resonance is easy in a range of a change in the rotational rate of the electric motor 3 will be described.

Figure 9:
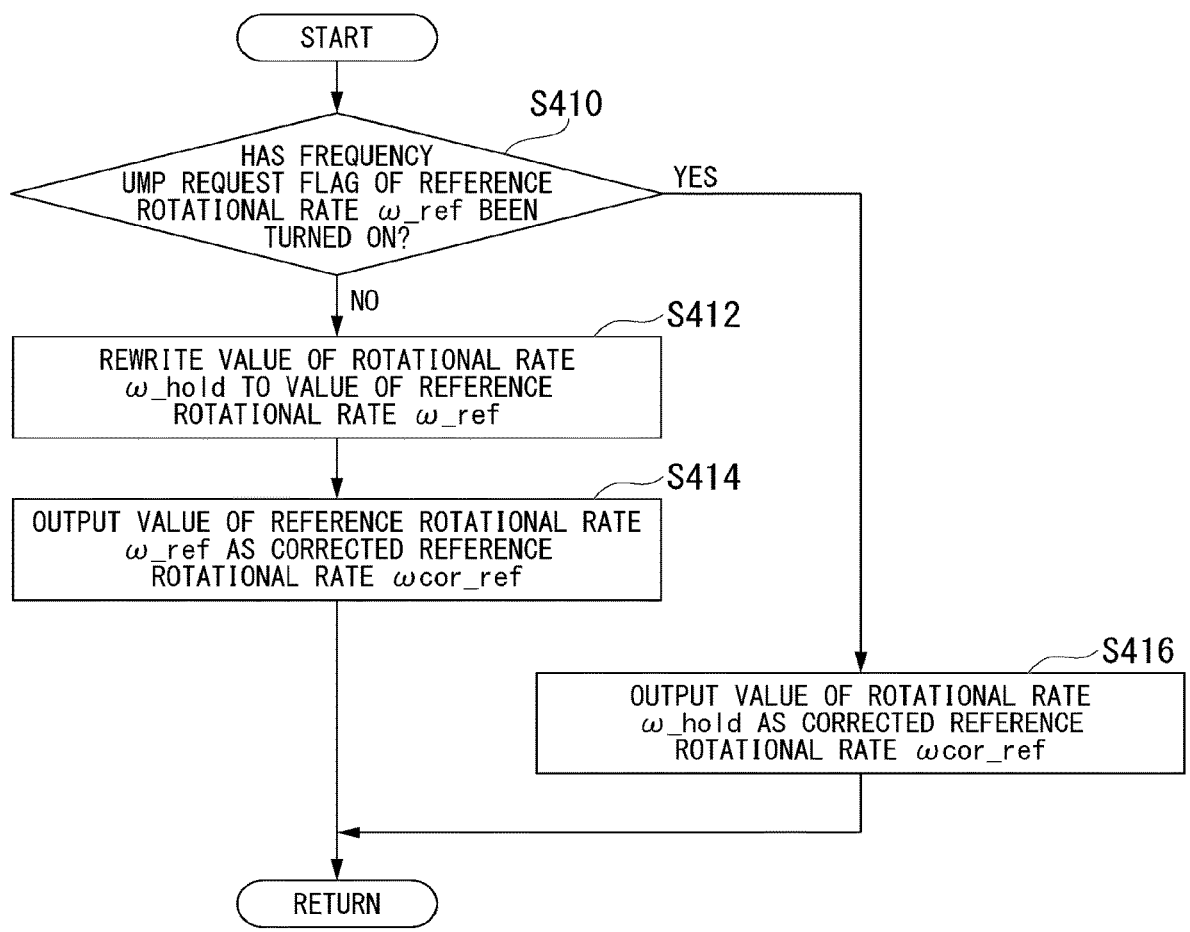
FIG. 9 is a flowchart of a reference rotational rate change process of a fourth embodiment.

FIG. 9 is a flowchart of a reference rotational rate change process of the fourth embodiment.

The reference rotational rate correction unit 62 of the first embodiment is read as a reference rotational rate correction unit 62C.

Before the following process is performed, a variable such as a rotational rate ω hold is initialized. The rotational rate ω_hold is a variable for holding the reference current rotational rate ω_ref of a present time point and using it in a process of a subsequent stage when a prescribed condition is satisfied, and is stored in, for example, a storage unit 621.

First, the reference rotational rate correction unit 62C determines whether or not the value of the reference rotational rate ω_ref is a value included in a region where a frequency jump request flag is turned on (referred to as a resonance detection region). For example, the reference rotational rate correction unit 62C determines whether or not the frequency jump request flag of the value of the reference rotational rate ω_ref has been turned on with reference to a frequency component data table 621t (S410).

When the frequency jump request flag corresponding to the value of the reference rotational rate ω_ref has not been turned on, the reference rotational rate correction unit 62C rewrites a value of the rotational rate ω hold to the value of the reference rotational rate ω_ref (S412). Thereby, the value of the rotational rate ω_hold in the storage unit 621 is updated with the reference rotational rate ω_ref in the current control cycle and is used in the next and subsequent processing cycles.

Subsequently, the reference rotational rate correction unit 62C outputs the value of the reference rotational rate ω_ref as the corrected reference rotational rate ωcor_ref (S414) and a series of processing steps ends.

When the frequency jump request flag corresponding to the value of the reference rotational rate ω_ref has been turned on, the reference rotational rate correction unit 62C outputs the value of the rotational rate ω_hold as the corrected reference rotational rate ωcor_ref (S416). In the above-described case, the series of processing steps ends in a state in which the value of the rotational rate ω_hold is not updated.

According to the above-described processing procedure, in addition to achieving effects similar to those of the second embodiment, the present invention is also applicable to a case in which there are a plurality of restriction regions including rotational rates at which resonance is easy.

Figure 10:
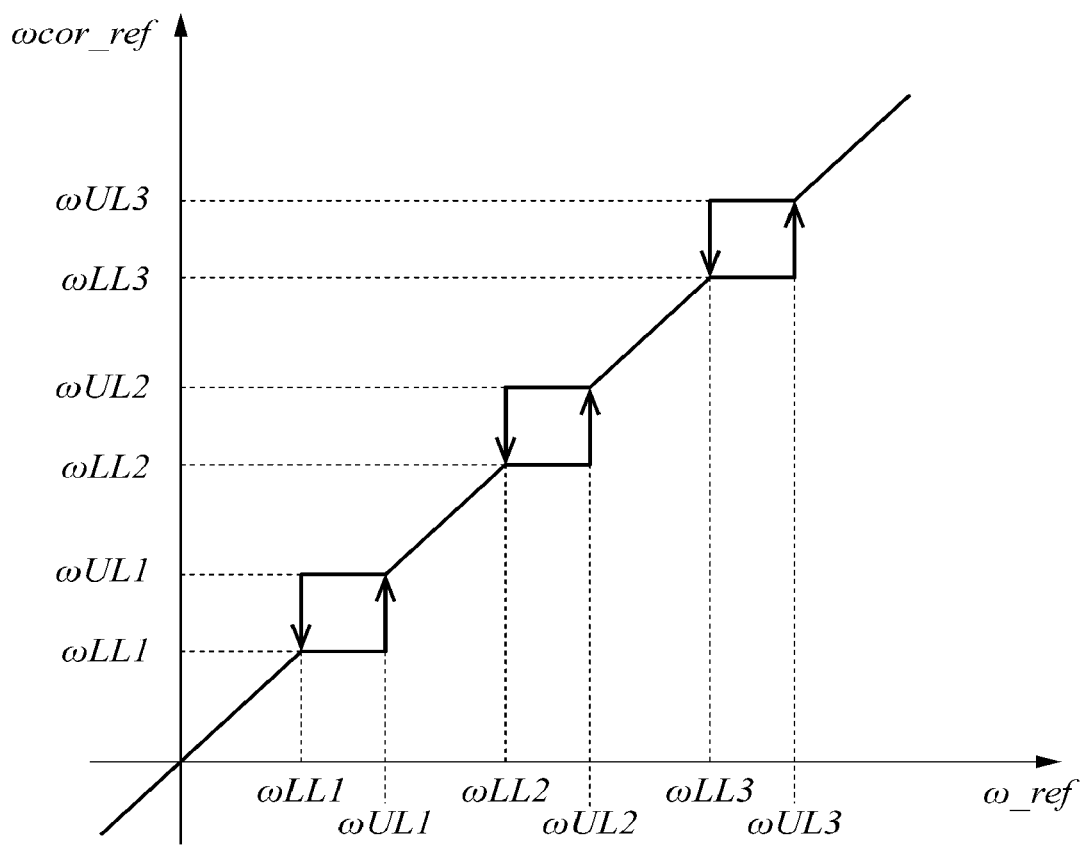
FIG. 10 is a flowchart for describing the reference rotational rate change process of the fourth embodiment.

FIG. 10 is a diagram for describing a change in the reference rotational rate according to the fourth embodiment. A graph shown on the upper side of FIG. 10 shows a relationship between the reference rotational rate ω_ref (a horizontal axis) and the corrected reference rotational rate ωcor_ref (a vertical axis). Within the graph of FIG. 10, three restriction regions are shown as in the graph of FIG. 8. The relationship between the reference rotational rate ω_ref and the corrected reference rotational rate ωcor_ref shown in the graph of FIG. 10 is as shown in FIG. 6 described above.

Fifth Embodiment

A fifth embodiment will be described with reference to FIGS. 11A, 11B, and 11C.

In the first embodiment, an example in which the reference rotational rate correction unit 62 generates the frequency component data table 621t has been described. In the present embodiment, an example in which a reference rotational rate correction unit 62A acquires data Tb1 related to a frequency component data table 621t will be described.

Figure 11A:
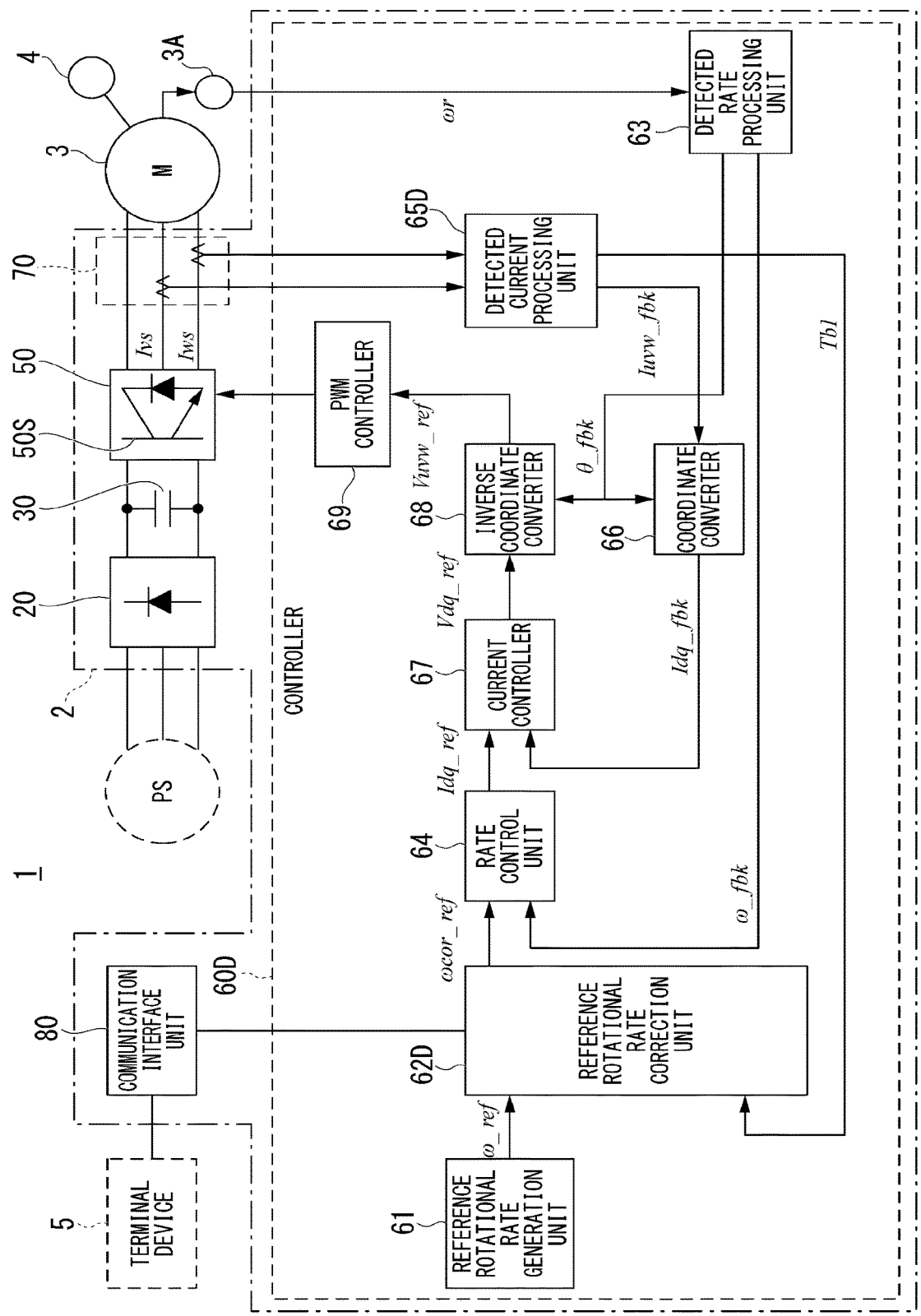
FIG. 11A is a configuration diagram of an electric motor drive system of a fifth embodiment.

FIG. 11A is a configuration diagram of an electric motor drive system of the fifth embodiment. FIG. 11B is a configuration diagram of a detected current processing unit of the fifth embodiment. FIG. 11C is a configuration diagram of a reference rotational rate correction unit of the fifth embodiment.

A controller 60D of an electric motor drive system 1 includes a reference rotational rate correction unit 62D and a detected current processing unit 65D instead of the reference rotational rate correction unit 62 and the detected current processing unit 65 of the controller 60 of the electric motor drive system 1.

For example, the detected current processing unit 65D generates data Tb1 related to the frequency component data table 621t and transmits the data Tb1 to the reference rotational rate correction unit 62D. The reference rotational rate correction unit 62D receives the data Tb1 from the detected current processing unit 65D instead of receiving the current value I_fbk supplied from the detected current processing unit 65 and performs a reference rotational rate correction process using the above data Tb1 as the data of the frequency component data table 621t.

Figure 11B:
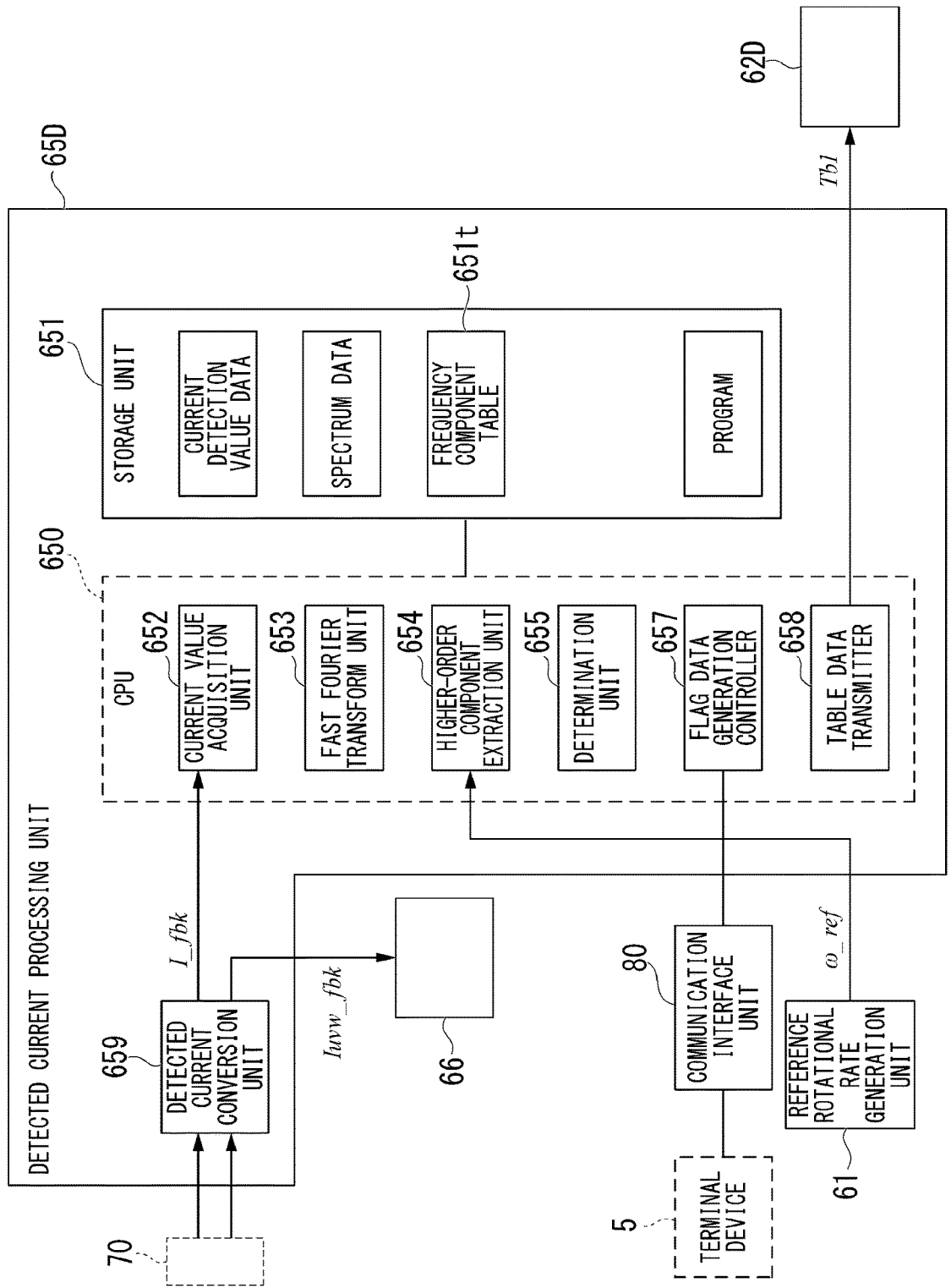
FIG. 11B is a configuration diagram of a detected current processing unit of the fifth embodiment.

As shown in FIG. 11B, the detected current processing unit 65D includes, for example, a storage unit 651, a current value acquisition unit 652, a fast Fourier transform unit 653, a higher-order component extraction unit 654, a determination unit 655, a flag data generation controller 657, a table data transmitter 658, and a detected current conversion unit 659.

Like the storage unit 621, the storage unit 651 stores current detection value data of the current value I_fbk, spectrum data, a frequency component data table 651t, a program of a reference rotational rate correction process, and the like and further stores a program of a detection current process and the like. For example, the frequency component data table 651t has a structure equivalent to that of the frequency component data table 621t (see FIG. 2) described above.

The current value acquisition unit 652, the fast Fourier transform unit 653, the higher-order component extraction unit 654, the determination unit 655, and the flag data generation controller 657 in the detected current processing unit 65D correspond to the current value acquisition unit 622, the fast Fourier transform unit 623, the higher-order component extraction unit 624, the determination unit 625, and the flag data generation controller 627 of the above-described reference rotational rate correction unit 62 and performs a process equivalent to the case of the reference rotational rate correction unit 62 using the storage unit 651.

The detected current conversion unit 659 outputs a current value Iuvw_fbk and a current value I_fbk based on a load current detected by the current detector 70.

The current value acquisition unit 652, the fast Fourier transform unit 653, the higher-order component extraction unit 654, the determination unit 655, and the flag data generation controller 657 function in cooperation with each other like the current value acquisition unit 622, the fast Fourier transform unit 623, the higher-order component extraction unit 624, the determination unit 625, and the flag data generation controller 627.

For example, the current value acquisition unit 652 acquires a current value I_fbk output by the detected current conversion unit 659. The current value acquisition unit 652, the fast Fourier transform unit 653, the higher-order component extraction unit 654, and the determination unit 655 perform their processes. As a result, the flag data generation controller 657 generates data related to the frequency component data table 651t and causes the storage unit 651 to store the generated data.

According to the above, the data related to the frequency component data table 651t is generated in the detected current processing unit 65D. The table data transmitter 658 reads the data Tb1 stored in the frequency component data table 651t and transmits the data Tb1.

Figure 11C:
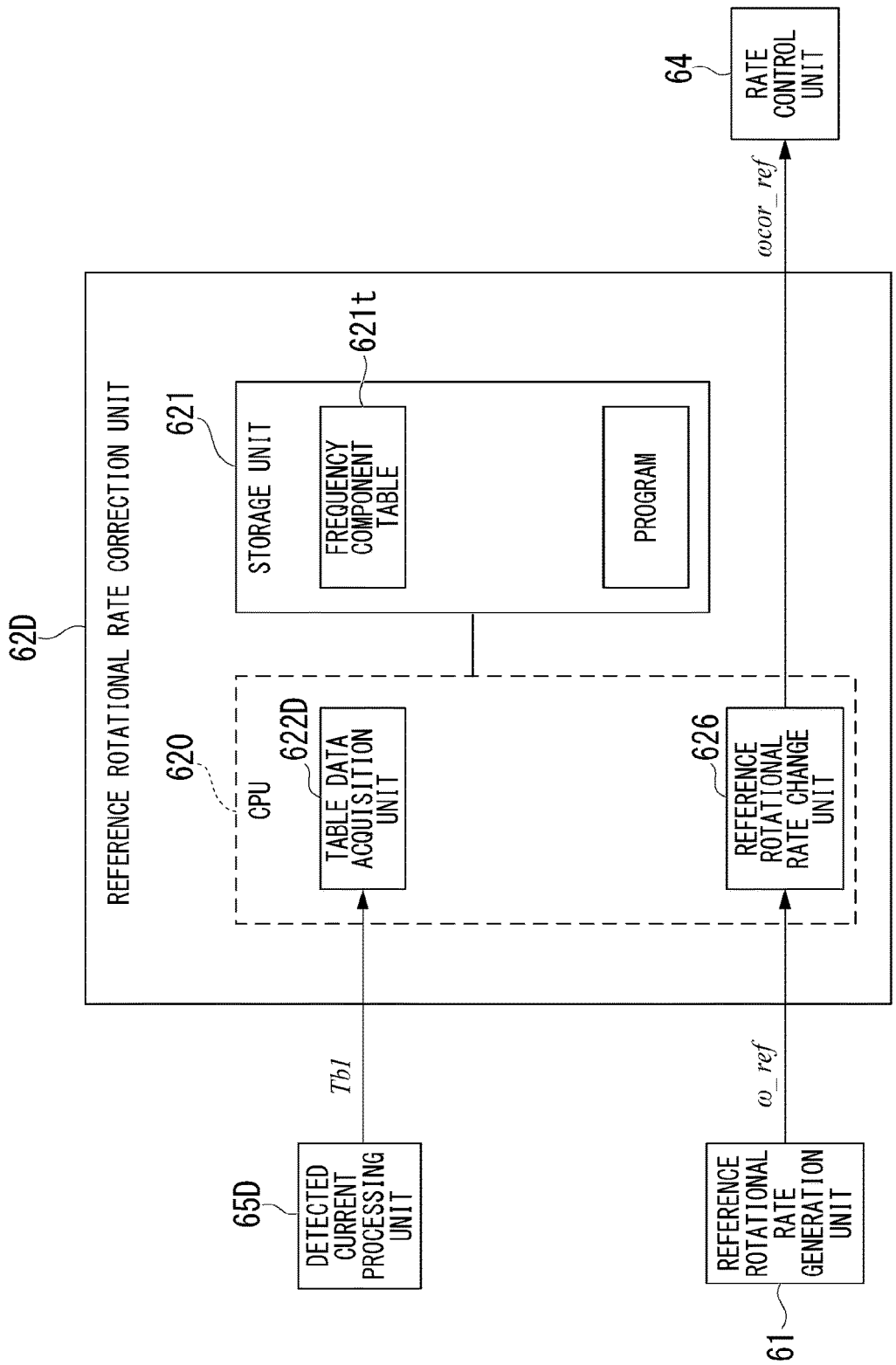
FIG. 11C is a configuration diagram of a reference rotational rate correction unit of the fifth embodiment.

As shown in FIG. 11C, for example, the reference rotational rate correction unit 62D does not include the fast Fourier transform unit 623, the higher-order component extraction unit 624, the determination unit 625, and the flag data generation controller 627 of the reference rotational rate correction unit 62, and includes a storage unit 621D instead of the storage unit 621, a table data acquisition unit 622D instead of the current value acquisition unit 622, and a reference rotational rate change unit 626.

The reference rotational rate correction unit 62D includes, for example, the storage unit 621D instead of the storage unit 621, the table data acquisition unit 622D instead of the current value acquisition unit 622, and the reference rotational rate change unit 626. Unlike the reference rotational rate correction unit 62, the reference rotational rate correction unit 62D may not include the fast Fourier transform unit 623, the higher-order component extraction unit 624, the determination unit 625, and the flag data generation controller 627.

The storage unit 621D stores at least the frequency component data table 621t and programs. The programs include programs for operating the table data acquisition unit 622D and the reference rotational rate change unit 626 and the like.

The table data acquisition unit 622D acquires the data Tb1 transmitted from the table data transmitter 658 and adds the data Tb1 to the frequency component data table 621t of the storage unit 621D.

It is only necessary for the reference rotational rate change unit 626 to perform control so that no resonance occur in an electric motor 3 by adjusting the reference rotational rate of the electric motor 3 so that a range where the frequency jump request flag is turned on is avoided on the basis of data of the frequency component data table 621t.

Also, the differences from the first embodiment have been mainly described in the present embodiment. In other respects, the reference rotational rate correction unit 62 of the first embodiment may be read as the reference rotational rate correction unit 62D and the detected current processing unit 65 may be read as the detected current processing unit 65D According to the above-described embodiment, the detected current processing unit 65D executes processing of the above-described "first step" to generate a frequency jump request flag serving as restriction information. The reference rotational rate change unit 626 executes processing of the above-described "second step" using the frequency jump request flag serving as the restriction information. More specifically, the reference rotational rate change unit 626 generates a corrected reference rotational rate ωcor_ref by correcting the reference rotational rate ω_ref using the frequency jump request flag serving as the restriction information. Thus, an entity for performing the processing of the "first step" and an entity for performing the processing of the "second step" can be separated. In other words, a configuration in which a CPU 650 related to the detected current processing unit 65D executes the processing of the above-described "first step" and a CPU 620 related to the reference rotational rate correction unit 62D performs the processing of the above-described "second step" can be adopted.

According to at least one embodiment described above, the power conversion device 2 of the embodiment includes the inverter 50, the current detector 70, the fast Fourier transform unit 623, the storage unit 621, the determination unit 625, the reference rotational rate change unit 626, and the rate control unit 64. The inverter 50 converts DC power into AC power by causing a switching device 50S to perform a switching operation and supplies the AC power to an electric motor 3. The current detector 70 detects a load current that flows from the inverter 50 to a winding of the electric motor 3. The fast Fourier transform unit 623 calculates a frequency component defined on the basis of fundamental waves of an AC of the detected load current. The storage unit 621 stores restriction information for excluding a reference rotational rate for a specific rotational rate from among reference rotational rates for designating rotational rates of the electric motor 3. The determination unit 625 determines a frequency at which a signal component having a magnitude exceeding a prescribed value has been detected among frequency components of the load current. After the determination, the determination unit 625 generates restriction information for excluding a reference rotational rate for a rotational rate corresponding to the frequency at which the signal component has been detected on the basis of a determination result. The determination unit 625 causes the storage unit to store the generated restriction information. The reference rotational rate change unit 626 changes a reference rotational rate of the electric motor 3 so that mechanical resonance of the frequency at which the signal component has been detected is avoided on the basis of the stored restriction information. The rate control unit controls the inverter and causes the electric motor to be driven at the rotational rate based on the changed reference rotational rate. Thereby, the electric motor 3 can be driven so that vibrations due to mechanical resonance do not occur.

While several embodiments of the present invention have been described, these embodiments have been presented by way of example only, and are not intended to limit the scope of the inventions. These embodiments may be embodied in a variety of other forms. Various omissions, substitutions, and changes may be made without departing from the spirit of the inventions. The inventions described in the accompanying claims and their equivalents are intended to cover such embodiments or modifications as would fall within the scope and spirit of the inventions.

For example, although an example in which at least one of the lower limit rate ωLL and the upper limit rate ωUL of the limit range is used has been described in the above-described embodiment, a second lower limit rate ωLLW and a second upper limit rate ωULW when a range wider than the above-described limit range is defined may be used instead of the lower limit rate ωLL and the upper limit rate co UL described above. At this time, the second lower limit rate ωLLW may be set to a smaller value relatively near the lower limit rate ωLL and the second upper limit rate ωULW may be set to a larger value relatively near the upper limit rate ωUL.

For example, a resonance point (a resonance frequency) of a mechanical system may be detected mechanically instead of or in addition to the determination based on the load current. When the resonance frequency is mechanically detected, a vibration sensor is placed on any one of the electric motor 3, the mechanical load 4, and the base on which the electric motor 3 and the mechanical load 4 are arranged and a determination may be made on the basis of a magnitude of vibrations indicated by an output signal of the vibration sensor.

REFERENCE SIGNS LIST

1, 1A Electric motor drive system
2 Power conversion device
3 Electric motor
4 Mechanical load
50 Inverter
60, 60D Controller
61 Reference rotational rate generation unit
62, 62A, 62B, 62C, 62D Reference rotational rate correction unit
64 Rate control unit
65, 65D Detected current processing unit
69 PWM controller
70 Current detector
621, 621D, 651 Storage unit
622, 652 Current value acquisition unit
623, 653 High-rate Fourier transform unit (frequency analysis processing unit)
624, 654 Higher-order component extraction unit
625, 655 Determination unit
626 Reference rotational rate change unit
627, 657 Flag data generation controller
658 Table data transmitter
659 Detected current conversion unit
621t, 651t Frequency component data table

The invention claimed is:

1. A power conversion device comprising:
an inverter configured to convert direct current (DC) power into alternating current (AC) power by causing a switching element to perform a switching operation and supply the AC power to an electric motor;
a current detector configured to detect a load current that flows from the inverter to a winding of the electric motor;
a frequency analysis processing unit configured to calculate an odd-order harmonic frequency component of a fundamental frequency, which is a frequency of fundamental waves corresponding to a reference rotational rate of the electric motor, as a frequency component of the load current on the basis of a result of detecting the load current, the fundamental frequency being a fundamental frequency of the load current;
a storage unit configured to store restriction information for excluding a reference rotational rate related to a specific rotational rate of the electric motor from among a plurality of reference rotational rates for designating rotational rates of the electric motor;
a determination unit configured to determine a frequency at which a signal component having a magnitude exceeding a prescribed value has been detected among frequency components of the load current, generate restriction information for excluding a reference rotational rate related to the rotational rate corresponding to the frequency at which the signal component has been detected on the basis of a determination result after the determination, and cause the storage unit to store the generated restriction information;

a reference rotational rate change unit configured to change the reference rotational rate of the electric motor so that mechanical resonance of the frequency at which the signal component has been detected is avoided on the basis of the stored restriction information; and a rate control unit configured to control a rotational rate of the inverter using the changed reference rotational rate and cause the electric motor to be driven at the controlled rotational rate.

2. The power conversion device according to claim 1, wherein the frequency analysis processing unit calculates a frequency component defined on the basis of fundamental waves of an AC of the load current using a high-rate Fourier transform process.

3. The power conversion device according to claim 1, further comprising an extraction unit configured to extract integer-order harmonic components of values of a reference rotational rate ω_ref from a spectrum using the values of the reference rotational rate ω_ref, wherein the frequency analysis processing unit generates a spectrum of the load current, and wherein the extraction unit calculates frequency components of the load current corresponding to a frequency of an integer-order harmonic component of a fundamental frequency and outputs the frequency components of the load current corresponding to the frequency of the integer-order harmonic component.

4. The power conversion device according to claim 1, further comprising an extraction unit configured to extract integer-order harmonic components of values of a reference rotational rate ω_ref from a spectrum using the values of the reference rotational rate ω_ref, wherein the frequency analysis processing unit generates a spectrum of the load current, and wherein the extraction unit calculates frequency components of the load current corresponding to a frequency of an odd-order harmonic component of a fundamental frequency and outputs the frequency components of the load current corresponding to the frequency of the odd-order harmonic component.

5. The power conversion device according to claim 1, wherein the storage unit stores the restriction information for defining whether or not the rotational rate required to be restricted is within a range thereof in a table associated with the plurality of reference rotational rates, the restriction information being restriction information for excluding the reference rotational rate related to the specific rotational speed of the electric motor from among the plurality of reference rotational rates whose values are defined different from each other, wherein the determination unit causes the generated restriction information to be stored in the table of the storage unit, and wherein, when a first rotational rate for the frequency at which the signal component has been detected has been designated as the rotational rate of the electric motor, the reference rotational rate change unit changes the reference rotational rate of the electric motor from the first rotational rate to a second rotational rate for the frequency at which the signal component has not been detected among rotational rates relatively near the first rotational rate on the basis of the stored restriction information included in the table.

6. The power conversion device according to claim 5, wherein, when the first rotational rate for the frequency at which the signal component has been detected has been designated as the rotational rate of the electric motor, the reference rotational rate change unit changes the reference rotational rate of the electric motor from the first rotational rate to one of a lower limit value and an upper limit value of a second rotational rate for the frequency at which the signal component has not been detected among rotational rates relatively near the first rotational rate on the basis of the stored restriction information included in the table.

7. The power conversion device according to claim 6, wherein the reference rotational rate change unit switches the reference rotational rate of the electric motor to one of the lower limit value and the upper limit value using a value between the lower limit value and the upper limit value of the range defined in the table.

8. An electric motor drive system comprising:

an electric motor;

an inverter configured to convert direct current (DC) power into alternating current (AC) power by causing a switching element to perform a switching operation and supply the AC power to the electric motor;

a current detector configured to detect a load current that flows from the inverter to a winding of the electric motor;

a frequency analysis processing unit configured to calculate an odd-order harmonic frequency component of a fundamental frequency, which is a frequency of fundamental waves corresponding to a reference rotational rate of the electric motor, as a frequency component of the load current on the basis of a result of detecting the load current, the fundamental frequency being a fundamental frequency of the load current;

a storage unit configured to store restriction information for excluding a reference rotational rate related to a specific rotational rate of the electric motor from among a plurality of reference rotational rates for designating rotational rates of the electric motor;

a determination unit configured to determine a frequency at which a signal component having a magnitude exceeding a prescribed value has been detected among frequency components of the load current, generate restriction information for excluding a reference rotational rate related to the rotational rate corresponding to the frequency at which the signal component has been detected on the basis of a determination result after the determination, and cause the storage unit to store the generated restriction information;

a reference rotational rate change unit configured to change the reference rotational rate of the electric motor so that mechanical resonance of the frequency at which the signal component has been detected is avoided on the basis of the stored restriction information; and a controller configured to control the inverter using the changed reference rotational rate so that the electric motor is driven at the rotational rate based on the reference rotational rate.

* * * * *